(12) United States Patent
Huo et al.

(10) Patent No.: US 12,526,358 B2
(45) Date of Patent: Jan. 13, 2026

(54) HOUSING ASSEMBLY AND ELECTRONIC DEVICE

(71) Applicant: HONOR DEVICE CO., LTD., Shenzhen (CN)

(72) Inventors: Wenlong Huo, Shenzhen (CN); Xuyang Wang, Shenzhen (CN); Fangbing Cheng, Shenzhen (CN); Chengjie Gao, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 344 days.

(21) Appl. No.: 17/908,365

(22) PCT Filed: Apr. 21, 2022

(86) PCT No.: PCT/CN2022/088146
§ 371 (c)(1),
(2) Date: Aug. 31, 2022

(87) PCT Pub. No.: WO2022/267659
PCT Pub. Date: Dec. 29, 2022

(65) Prior Publication Data
US 2024/0195899 A1    Jun. 13, 2024

(30) Foreign Application Priority Data

Jun. 26, 2021   (CN) .......................... 202110715237.8
Oct. 28, 2021   (CN) .......................... 202111264629.3

(51) Int. Cl.
*H04M 1/02*   (2006.01)

(52) U.S. Cl.
CPC ................ *H04M 1/0283* (2013.01)

(58) Field of Classification Search
CPC ... H04M 1/185; H04M 1/0283; G06F 1/1656; G06F 1/1626
See application file for complete search history.

(56) References Cited

U.S. PATENT DOCUMENTS

2011/0048755 A1* 3/2011 Su ........................ H05K 5/0243
                                                                  72/352
2011/0279006 A1* 11/2011 Zhang .................. H05K 7/1489
                                                                  248/214

(Continued)

FOREIGN PATENT DOCUMENTS

CN        102131356 A      7/2011
CN        107370855 A      11/2017
(Continued)

*Primary Examiner* — Timothy J Thompson
*Assistant Examiner* — Rhadames Alonzo Miller
(74) *Attorney, Agent, or Firm* — WOMBLE BOND DICKINSON (US) LLP

(57) ABSTRACT

A housing assembly includes a middle frame, a support and a decorative part. The middle frame includes a middle frame body and a border frame, where the border frame is connected to an outer edge of the middle frame body. The support includes a support body and tailbones. The support body includes a first support surface and a second support surface, where the first support surface and the second support surface face away from each other. The tailbone is connected to an outer edge of the support body. The tailbone includes a protrusion with the protrusion protruding from the first support surface. The decorative part is mounted on the first support surface with an end of the decorative part connected to the tailbone. The support is mounted on the middle frame with the second support surface facing the middle frame.

20 Claims, 14 Drawing Sheets

(56) References Cited

U.S. PATENT DOCUMENTS

2014/0177151 A1\* 6/2014 Manda .................. G06F 1/1633
                                                    361/679.56
2017/0012659 A1   1/2017 Kim et al.
2020/0198195 A1\* 6/2020 Ren ......................... H04M 1/02

FOREIGN PATENT DOCUMENTS

| CN | 108430177 A | 8/2018 |
| CN | 108471460 A | 8/2018 |
| CN | 108494912 A | 9/2018 |
| CN | 210671188 U | 6/2020 |
| CN | 111770224 A | 10/2020 |
| CN | 212463784 U | 2/2021 |
| CN | 212969729 U | 4/2021 |
| CN | 114158208 A | 3/2022 |

\* cited by examiner

HOUSING ASSEMBLY AND ELECTRONIC DEVICE

CROSS-REFERENCE TO RELATED APPLICATIONS

This application is a National Stage of International Application No. PCT/CN2022/088146, filed on Apr. 21, 2022, which claims priority to Chinese Patent Application No. 202110715237.8. filed on Jun. 26, 2021 and Chinese Patent Application No. 202111264629.3 filed on Oct. 28, 2021. Both of the aforementioned applications are hereby incorporated by reference in their entireties.

TECHNICAL FIELD

This application relates to the field of electronic product technologies, and in particular, to a housing assembly and an electronic device.

BACKGROUND

Leather rear covers are gradually sought after and favored by consumers in application in electronic devices such as cellphones and tablets due to their aesthetic appearance and comfortable hand feel. However, leather rear covers have poor match with middle frames. When a leather rear cover is mounted to a middle frame, a relatively large gap is usually present between the leather rear cover and the middle frame, affecting aesthetics of the rear cover and user experience.

SUMMARY

This application provides a housing assembly and an electronic device to resolve technical problems of poor match and large gap between a rear cover and a middle frame in an existing housing assembly.

According to a first aspect, this application provides a housing assembly, including a middle frame, a support and a decorative part. The middle frame includes a middle frame body and a border frame, where the border frame is connected to an outer edge of the middle frame body. The support includes a support body and a tailbone. The support body includes a first support surface and a second support surface, where the first support surface and the second support surface face away from each other. The tailbone is connected to an outer edge of the support body. The tailbone includes a protrusion with the protrusion protruding from the first support surface. The decorative part is mounted on the first support surface with an end of the decorative part connected to the tailbone. The support is mounted on the middle frame with the second support surface facing the middle frame. The support and the decorative part are connected to form a rear cover.

In this application, the support and the middle frame are connected, so that the rear cover and the middle frame are connected, improving match between the rear cover and the middle frame. Moreover, with the tailbone provided on the support, a gap between the support and the middle frame can be reduced, increasing aesthetics of the housing assembly and improving user experience. In addition, the tailbone provide protection for the decorative part, which can prevent the decorative part from curling or damage that affects aesthetics of the housing assembly and user experience.

In an implementation, the end of the decorative part includes a decorative part end surface, and the tailbone includes a first tailbone surface, where the tailbone and the support body enclose a mounting recess with the first tailbone surface facing the mounting recess. The decorative part is mounted in the mounting recess with the decorative part end surface opposite the first tailbone surface. In this embodiment, the tailbone provide protection for the decorative part, which can prevent the decorative part from curling or damage from an end close to the decorative part end surface that affects aesthetics of the housing assembly and user experience.

In an implementation, the support body includes a first support segment and second support segments, where the second support segment is connected to an outer edge of the first support segment.

In an implementation, the tailbone includes a tailbone end surface, where the tailbone end surface is connected to the first tailbone surface, with the tailbone end surface located at an end of the tailbone; and the decorative part includes a first decorative part surface and a second decorative part surface, where the first decorative part surface and the second decorative part surface face away from each other, and the decorative part is mounted on the support, with the second decorative part surface facing the support and smooth transition present between the tailbone end surface and the first decorative part surface. In this embodiment, smooth transition is present without a gap between the first decorative part surface and the tailbone end surface, which can reduce a scratchy feel and further increase aesthetics of the housing assembly.

In an implementation, the border frame includes a border frame outer surface, and the support is mounted on the middle frame, with smooth transition present between the tailbone end surface and the border frame outer surface. This may be understood as that the tailbone end surface and the border frame outer surface form a surface, with the surface being a curved surface. The tailbone end surface extends towards the border frame outer surface and smoothly transits to the border frame outer surface. In this embodiment, the tailbone is provided on the support and smooth transition is present between the tailbone end surface and the border frame outer surface, which increases aesthetics of the housing assembly and reduces a scratchy feel, thereby improving user experience.

In an implementation, the tailbone includes a second tailbone surface, where the second tailbone surface and the first tailbone surface face away from each other, the tailbone end surface is connected between the first tailbone surface and the second tailbone surface, and an included angle between the tailbone end surface and the first tailbone surface is an acute angle. In this embodiment, a protruding part of the tailbone may be reduced while the tailbone provides protection for the decorative part and the decorative part end surface, which further prevents the tailbone end surface of the tailbone from giving a scratchy feel, thereby improving user experience.

In an implementation, the support further includes extensions, where the extension is connected to the protrusion of the tailbone. The support is mounted on the middle frame with the extension extending towards the border frame. In this embodiment, the provided extensions can further reduce a gap between the support and the border frame, increasing aesthetics of the housing assembly and reducing dust and moisture into the gap between the support and the border frame.

In an implementation, the extension includes an extension side surface and an extension bottom surface, where the extension bottom surface is connected between the second tailbone surface and the extension side surface, and the extension side surface is connected to the tailbone end surface. Smooth transition is present between the extension side surface and the border frame outer surface. In this embodiment, smooth transition is present between the extension and the middle frame to ensure smooth transition between the support and the middle frame, increasing aesthetics of the housing assembly and reducing a scratchy feel, thereby improving user experience.

In an implementation, the extension further includes a connecting surface, where the connecting surface is connected between the extension bottom surface and the extension side surface. The connecting surface may be a plane or a curved surface. In this embodiment, the provided connecting surface can prevent the extension side surface and the extension bottom surface from being directly connected to form a sharp angle that results in a scratchy feel and affects user experience.

In an implementation, a maximum size of a gap between the extension and the border frame in a thickness direction of the housing assembly is 0.05 mm to 0.1 mm. In this embodiment, the provided extensions can further reduce a gap between the support and the border frame, increasing aesthetics of the housing assembly and reducing dust and moisture into the gap between the support and the border frame.

In an implementation, an included angle between a length direction of the tailbone and an extension direction of the second support segment is 60 degrees to 120 degrees, so as to ensure that the tailbone can provide protection for the decorative part and be assembled with the middle frame, thereby reducing the gap between the middle frame and the support.

In an implementation, a distance between the decorative part end surface and the first tailbone surface is 0) mm to 0.1 mm.

In an implementation, the tailbone includes a second tailbone surface, where the second tailbone surface and the first tailbone surface face away from each other, and a minimum distance between the second tailbone surface and the border frame is 0.03 mm to 0.1 mm.

In an implementation, the first support segment includes a first surface and a second surface, the first surface and the second surface facing away from each other, and the second support segment includes a third surface and a fourth surface, the third surface and the fourth surface facing away from each other. The first surface and the third surface are joined together to form the first support surface, with the first support surface being a plane. The second surface and the fourth surface are joined together to form the second support surface, with the second support surface being a plane. In other words, the support body is of a flat plate shape.

In an implementation, at least part of the second support segment is curved relative to the first support segment. The second support segment is curved towards the middle frame. In this embodiment, the second support segments are provided on the support and at least part of the second support segment is curved relative to the first support segment to increase three-dimensional sense of the housing assembly, thereby increasing aesthetics of the housing assembly and improving user experience.

In an implementation, the tailbone include two first sub-tailbones and two second sub-tailbones. The second support segments include two first sub-support segments and two second sub-support segments, where the two first sub-support segments are connected to two opposite ends of the first support segment in a width direction of the housing assembly, with the first sub-support segments being curved relative to the first support segment, and the two second sub-support segments are connected to two opposite ends of the first support segment in a length direction of the housing assembly. One such first sub-tailbone is connected to an end of one such first sub-support segment away from the first support segment. One such second sub-tailbone is connected to an end of one such second sub-support segment away from the first support segment. The decorative part is mounted on the support, with the decorative part end surfaces located in the width direction of the housing assembly connected to the first sub-tailbones, and the decorative part end surfaces located in the length direction of the housing assembly connected to the second sub-tailbones.

In this embodiment, the first sub-support segments located at two opposite ends in the width direction of the housing assembly are disposed as curved relative to the first support segment, and the second sub-support segments located at two opposite ends in the length direction of the housing assembly are disposed as flat and straight, which can simplify a structure of the housing assembly while increasing three-dimensional sense of the housing assembly. In addition, the first sub-tailbones protect the decorative part and the decorative part end surfaces in a width direction of the decorative part, preventing the decorative part from curling or damage. The second sub-tailbones protect the decorative part and the decorative part end surfaces in a length direction of the decorative part, further preventing the decorative part from curling or damage that affects aesthetics of the rear cover and user experience.

In an implementation, the two first sub-tailbones and the two second sub-tailbones are connected head to tail, and the two first sub-tailbones and the two second sub-tailbones are integrally formed to increase stability of the tailbone structure.

In an implementation, the decorative part is made of vegan leather, silica gel, leather texture vegetation, or animal leather. The decorative part made of leather has good appearance and texture, comfortable touch, skin-friendly characteristic, good wear resistance and aging resistance, and light weight, which is conducive to light-weighting of an electronic device.

In an implementation, the support is made of fiber reinforced resin. The resin may be heat convertible resin, such as polyurethane, or may be thermoplastic resin, such as polycarbonate. The fiber includes but is not limited to aramid fiber, fiberglass, and carbon fiber. The support made of a fiber reinforced resin material has advantages of high strength and light weight.

In an implementation, the housing assembly includes a first bonding member, and the first bonding member is disposed between the support and the decorative part and bonds the support and the decorative part. In this embodiment, the first bonding member is hot melt adhesive. Hot melt adhesive melts when heated and can be cured at room temperature with fast bonding performance, high bonding strength, and a wide range of bonding materials. In other embodiments, the first bonding member may alternatively be double-sided adhesive or other glues, provided that fixed connection between the decorative part and the support is implemented.

In an implementation, the housing assembly includes a second bonding member, and the second bonding member is disposed between the middle frame and the support and bonds the middle frame and the support, so as to increase stability of connection between the support and the middle frame.

According to a second aspect, this application provides an electronic device, including a body and the foregoing housing assembly, where the body is mounted in the housing assembly.

In summary, in this application, the support and the middle frame are connected, so that the rear cover and the middle frame are connected, improving match between the rear cover and the middle frame. Moreover, with the tailbone provided on the support, a gap between the support and the middle frame can be reduced, increasing aesthetics of the housing assembly and improving user experience. In addition, the tailbone provide protection for the decorative part, which can prevent the decorative part from curling or damage that affects aesthetics of the housing assembly and user experience.

DESCRIPTION OF EMBODIMENTS

The following describes the embodiments of this application with reference to the accompanying drawings in the embodiments of this application.

Figure 1:
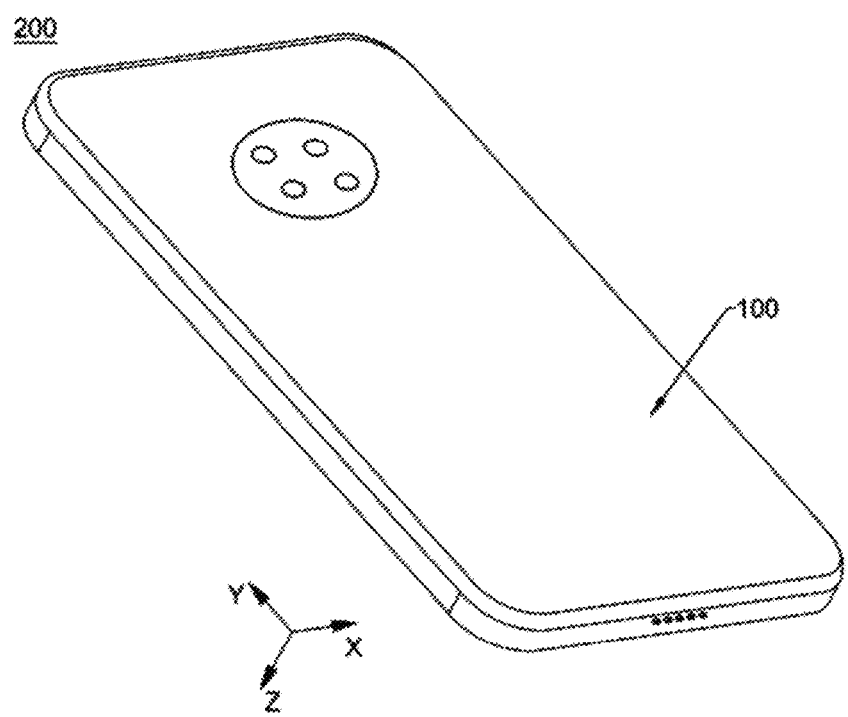
FIG. 1 is a schematic structural diagram of an electronic device according to an embodiment of this application.

Referring to FIG. 1, FIG. 1 is a schematic structural diagram of an electronic device according to an embodiment of this application. The electronic device 200 includes but is not limited to a cellphone (cellphone), a notebook computer (notebook computer), a tablet computer (tablet personal computer), a laptop computer (laptop computer), a personal digital assistant (personal digital assistant), a wearable device (wearable device), a mobile device (mobile device), and the like. In this embodiment of this application, a cellphone is used as an example of the electronic device 200 for description.

For ease of description, a width direction of the electronic device 200 is defined as a direction X, a length direction of the electronic device 200 is defined as a direction Y, and a thickness direction of the electronic device 200 is defined as a direction Z. The direction X, direction Y and direction Z are perpendicular to each other.

The electronic device 200 includes a body (not shown in the figure) and a housing assembly 100. The body is mounted in the housing assembly 100.

Figure 2:
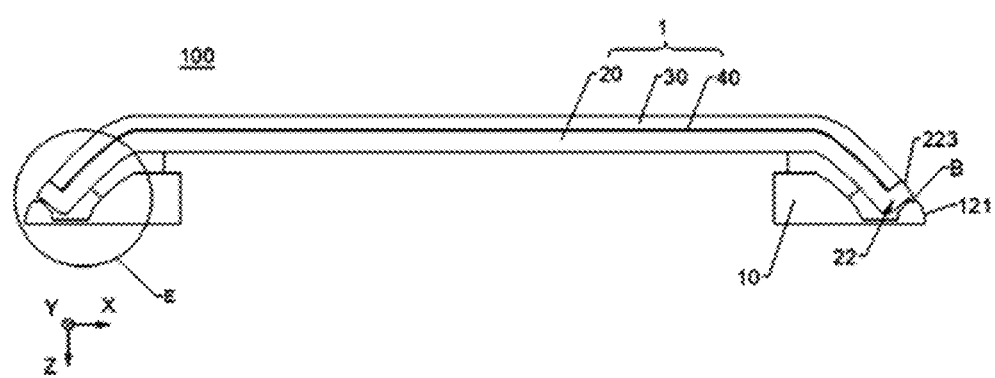
FIG. 2 is a partial structural schematic diagram of a housing assembly in the electronic device shown in FIG. 1.
Figure 3:
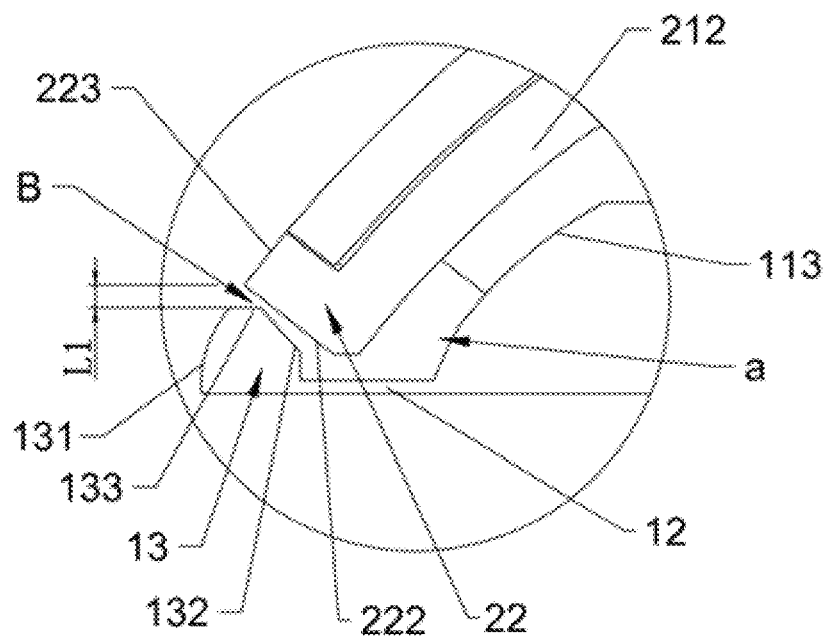
FIG. 3 is an enlarged schematic structural diagram of an area E in the housing assembly shown in FIG. 2.
Figure 4:
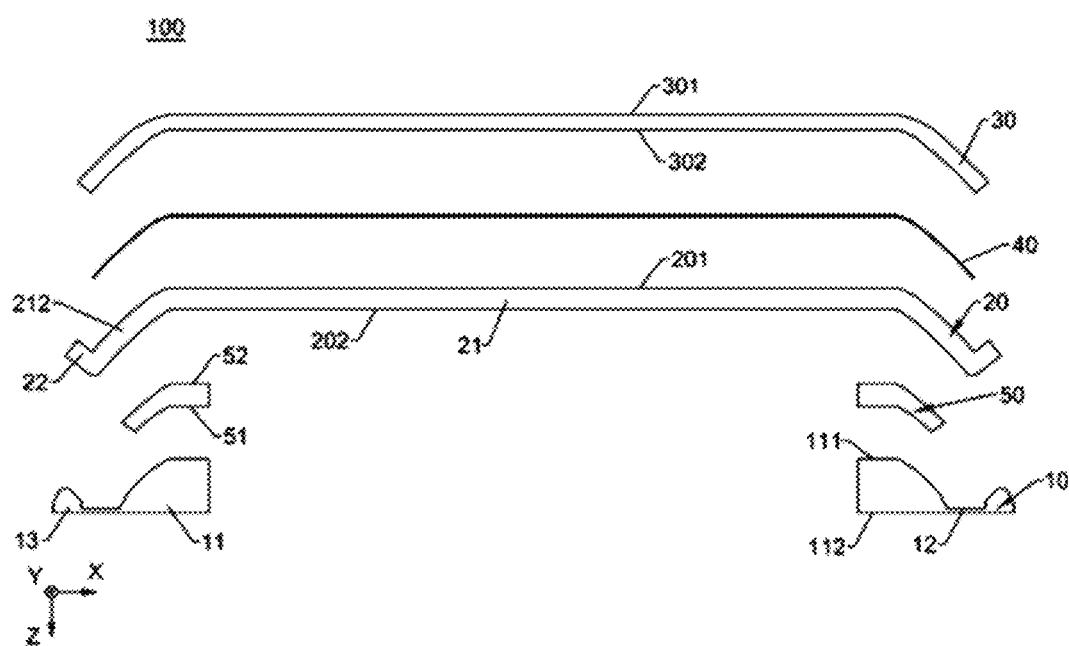
FIG. 4 is a schematic exploded structural diagram of the housing assembly shown in FIG. 2.

Referring to FIG. 2 to FIG. 4, FIG. 2 is a partial structural schematic diagram of the housing assembly 100 in the electronic device shown in FIG. 1, FIG. 3 is an enlarged schematic structural diagram of an area E in the housing assembly 100 shown in FIG. 2, and FIG. 4 is a schematic exploded structural diagram of the housing assembly 100 shown in FIG. 2.

The housing assembly 100 includes a rear cover 1 and a middle frame 10. The rear cover 1 is mounted to the middle frame 10 and is fixedly connected to the middle frame 10. The rear cover 1 includes a support 20 and a decorative part 30. The decorative part 30 is fixedly connected to the support 20, and a surface of the support 20 facing away from the decorative part 30 faces the middle frame 10.

Figure 5:
FIG. 5 is a partial structural schematic diagram of a middle frame in the housing assembly shown in FIG. 4.

Referring to FIG. 5. FIG. 5 is a partial structural schematic diagram of the middle frame 10 in the housing assembly 100 shown in FIG. 4.

The middle frame 10 is made of an aluminum alloy material. In other embodiments, the middle frame 10 may alternatively be made of metal materials such as stainless steel, steel-aluminum composite die cast, and titanium alloy. The middle frame 10 made of metal materials has good heat dissipation performance as well as good appearance, texture and touch. Alternatively: the middle frame 10 may be made of plastic. The plastic includes but is not limited to polycarbonate (PC), acrylonitrile-butadiene-styrene (ABS), polystyrene (PS), and polyamide (PA). The middle frame 10 made of plastic has light weight, which helps make electronic devices thinner and lighter.

The middle frame 10 includes a middle frame body 11, an avoidance part 12, and a border frame 13. The middle frame body 11 includes a first surface 111, a second surface 112 and a first side surface 113. The first surface 111 and the second surface 112 face away from each other. The first side surface 113 is connected to the first surface 111 and surrounds an outer edge of the first surface 111, with the first side surface 113 being a curved surface. In another implementation, the first side surface 113 may alternatively be a plane or a tilted surface. The middle frame body 11 is further provided with a groove a. The groove a is located at an edge of the middle frame body 11 and concavely disposed from the first surface 111 towards a positive direction of the Z axis, so as to form the avoidance part 12 and the border frame 13 on the middle frame body 11.

The avoidance part 12 is located at an outer edge of the middle frame body 11 and connects to the middle frame body 11. The avoidance part 12 includes an upper surface 121 which is a bottom wall of the groove a. The border frame 13 includes a border frame outer surface 131, a border frame inner surface 132, and a border frame top surface 133. The border frame outer surface 131 and the border frame inner surface 132 face away from each other, and the border frame top surface 133 is connected between the frame outer surface 131 and the border frame inner surface 132. The border frame inner surface 132 is connected to the upper surface 121 of the avoidance part 12. That is, the border frame 13 is connected to an end of the avoidance part 12 facing away from the middle frame body 11, with the border frame 13 located around the avoidance part 12. In this embodiment, the border frame outer surface 131 is a curved surface. The border frame inner surface 132 includes two connected surfaces, or the border frame inner surface 132 may also be a curved surface. The border frame inner surface 132 and the first side surface 113 are side walls of the groove a.

In this embodiment, the middle frame body 11, the avoidance part 12, and the border frame 13 are integrally formed to ensure stability of a structure of the middle frame 10.

Figure 6:
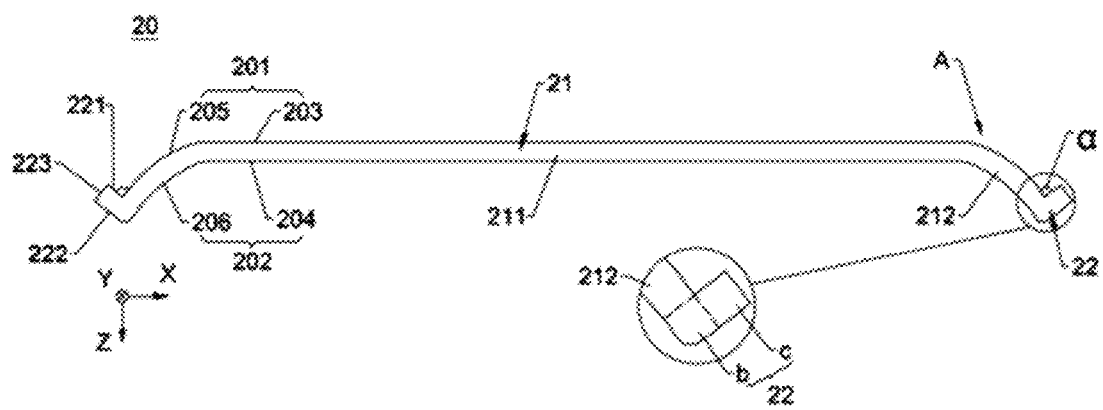
FIG. 6 is a schematic structural diagram of a support in the housing assembly shown in FIG. 4.

Referring to FIG. 6, FIG. 6 is a schematic structural diagram of the support 20 in the housing assembly 100 shown in FIG. 4.

The support 20 is made of a fiber reinforced resin material. The resin may be heat convertible resin, such as polyurethane, or may be thermoplastic resin, such as polycarbonate. The fiber includes but is not limited to aramid fiber, fiberglass, and carbon fiber. The support 20 made of the fiber reinforced resin material has advantages of high strength and light weight.

The support 20 includes a support body 21 and a tailbone 22. The support body 21 includes a first support segment 211 and second support segments 212. The second support segment 212 is connected to an outer edge of the first support segment 211. The first support segment 211 includes a first surface 203 and a second surface 204, the first surface 203 and the second surface 204 facing away from each other. The second support segment 212 includes a third surface 205 and a fourth surface 206, the third surface 205 and the fourth surface 206 facing away from each other. After the second support segments 212 and the first support segment 211 are connected, surfaces of them facing one same direction together form a first support surface 201 and surfaces of them facing the other same direction together form a second support surface 202, which are surfaces of the support body 21, with the first support surface 201 and the second support surface 202 facing away from each other. The first surface 203 and the third surface 205 together form the first support surface 201, and the second surface 204 and the fourth surface 206 together form the second support surface 202. The second support segment 212 is curved along the first support surface 201 towards the second support surface 202. In this embodiment, the second support segment 212 is arc-shaped. In other words, both the third surface 205 and the fourth surface 206 are curved surfaces.

The tailbone 22 includes a tailbone body b and a protrusion c. The tailbone body b is connected to the second support segment 212, and the protrusion c is connected to the tailbone body b, with the protrusion c protruding from the third surface 205. It should be noted that the support body 21, the tailbone body b and the protrusion c are an integrally formed component. Dotted lines in FIG. 6 are merely for ease of description and are actually not present.

The tailbone 22 further includes a first tailbone surface 221, a second tailbone surface 222 and a tailbone end surface 223. The first tailbone surface 221 and the second tailbone surface 222 face away from each other, the tailbone end surface 223 is located at a free end of the tailbone 22, and the tailbone end surface 223 is connected between the first tailbone surface 221 and the second tailbone surface 222. The tailbone 22 is connected to an end of the second support segment 212 away from the first support segment 211. That is, the tailbone 22 surrounds an outer edge of the first support segment 211, with the protrusion c of the tailbone 22 protruding from the third surface 205. An included angle between an extension direction of the tailbone 22 and an extension direction of the second support segment 212 is a first included angle $\alpha$, which is 60 degrees to 120 degrees. It should be noted that the extension direction of the tailbone 22 mentioned herein is a length direction of the tailbone 22, that is, an extension direction facing away from the third surface 205. In this embodiment, the first included angle $\alpha$ is 90 degrees, and in other embodiments, the first included angle $\alpha$ may alternatively be greater or less than 90 degrees. A size of the first tailbone 22 in its extension direction is 0.3 mm to 0.6 mm.

The support body 21 and the tailbone 22 together enclose mounting recesses A. The support body 21 is a bottom wall of the mounting recess A, with the first support surface 201 being a surface of the bottom wall of the mounting recess A, and the first tailbone surface 221 of the tailbone 22 is a side surface of the mounting recess A. The mounting recesses A are configured to mount the decorative part 30.

Figure 7:
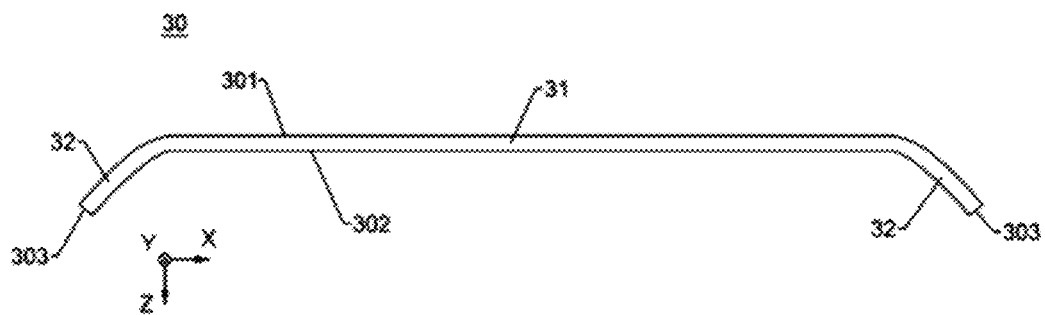
FIG. 7 is a schematic structural diagram of a decorative part in the housing assembly shown in FIG. 4.

Referring to FIG. 7, FIG. 7 is a schematic structural diagram of the decorative part 30 in the housing assembly 100 shown in FIG. 4.

In this embodiment, the decorative part 30 is made of vegan leather. Vegan leather refers to polyurethane leather. The decorative part 30 made of polyurethane has good appearance and texture, comfortable touch, skin-friendly characteristic, good wear resistance and aging resistance, and light weight, which is conducive to light-weighting of the electronic device 200. In other embodiments, the decorative part 30 may alternatively be made of artificial leather such as polyethylene or polyvinyl chloride. The decorative part 30 may alternatively be made of animal leather. Animal leather includes but is not limited to cattle hide, sheep skin, horsehide, and pigskin. The decorative part 30 made of animal leather has good appearance and texture, comfortable touch, and skin-friendly characteristic, which can improve user experience. The decorative part 30 may alternatively be made of silica gel. The decorative part 30 made of silica gel has low cost, good chemical stability, and high mechanical strength. The decorative part 30 may alternatively be made of leather texture vegetation. Leather texture vegetation is made of vegetation fiber. The decorative part 30) made of leather texture vegetation has excellent wear resistance and aging resistance, with advantages of sterilization, mildew-proofing, and environment-friendliness.

The decorative part 30 includes a first decorative segment 31 and second decorative segments 32. The second decorative segment 32 is connected to an outer edge of the first decorative segment 31. After the second decorative segments 32 and the first decorative segment 31 are connected, surfaces of them facing one same direction together form a first decorative part surface 301 and surfaces of them facing the other same direction together form a second decorative part surface 302, which are surfaces of the decorative part 30, with the first decorative part surface 301 and the second decorative part surface 302 facing away from each other. The second decorative segments 32 are located on a same side of the decorative part 30, with the second decorative segments 32 curved along the first decorative part surface 301 towards the second decorative part surface 302. The second decorative segments 32 are arc-shaped. The decorative part 30 further includes decorative part end surfaces 303. The decorative part end surface 303 is located at an end of the second decorative segment 32, with the decorative part end surface 303 connected between the first decorative part surface 301 and the second decorative part surface 302.

Figure 8:
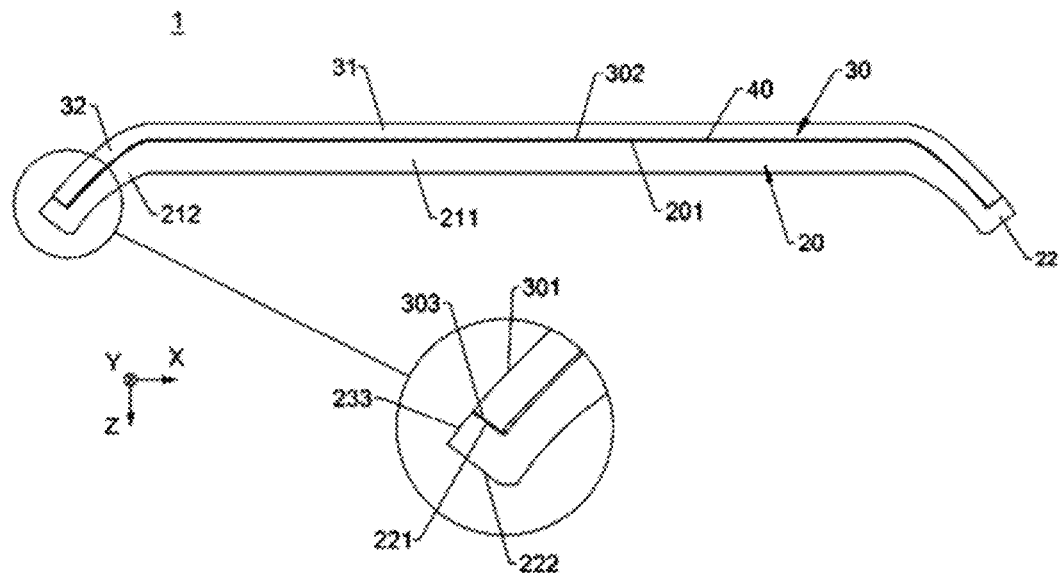
FIG. 8 is a schematic structural diagram of a rear cover in the housing assembly shown in FIG. 2.

Referring to FIG. 6 to FIG. 8, FIG. 8 is a schematic structural diagram of the rear cover 1 in the housing assembly 100 shown in FIG. 2.

The rear cover 1 includes the decorative part 30 and the support 20, where the decorative part 30 is mounted in the mounting recesses A of the support 20 and is fixedly connected to the support 20. The first decorative segment 31 is put right against the first support segment 211, and the second support segment 212 is put right against the second decorative segment 32, with the second decorative part surface 302 of the decorative part 30 facing the first support surface 201 of the support 20. The support 20 is used to support the decorative part 30. The "right against" herein means projection coincidence in a thickness direction (that is, the direction Z) of the housing assembly 100.

The decorative part end surface 303 of the decorative part 30 is opposite the first tailbone surface 221 of the tailbone 22. In this embodiment, the decorative part end surface 303 abuts against the first tailbone surface 221, meaning that an abutting force exists between the decorative part end surface 303 and the first tailbone surface 221 to ensure stability of connection between the decorative part end surface 303 and the first tailbone surface 221. In another implementation, the decorative part end surface 303 and the first tailbone surface 221 may alternatively be indirectly connected by a bonding agent or other means. Alternatively, a very small gap may be present between the decorative part end surface 303 and the first tailbone surface 221, and a size of the gap is 0 mm to 0.1 mm. That is, a distance from the first tailbone surface 221 to the decorative part end surface 303 is 0 mm to 0.1 mm.

The tailbone end surface 223 is flush with the first decorative part surface 301 located on the second decorative segment 32. That is, there is no gap or a very small gap (within an assembly tolerance range) present between the tailbone end surface 223 and the first decorative part surface 301 located on the second decorative segments 32, and smooth transition is present between the tailbone end surface 223 and the first decorative part surface 301 located on the second decorative segments 32. In this application, the smooth transition present between two surfaces may be understood as that a drop between one surface and another surface is less than or equal to 0.2 mm, and an included angle between a tangent plane of the one surface and that of the another surface at a relative position is less than or equal to 20 degrees. Alternatively, one surface and another surface can be coplanar. In other words, the one surface is in a same plane as the another surface; or a tangent plane of the one surface is continuous with that of the another surface. In some implementations, a drop between one surface and another surface may alternatively be less than or equal to 0.03 mm, so as to improve appearance consistency and smoothness of the housing assembly. The "smooth transition" mentioned below can be understood in the same way.

In this embodiment, a drop between the tailbone end surface 223 and the first decorative part surface 301 located on the second decorative segment 32 is less than or equal to 0.03 mm, and an included angle between a tangent plane of the tailbone end surface 223 and that of the first decorative part surface 301 located on the second decorative segment 32 is less than or equal to 20 degrees. In an implementation, the tailbone end surface 223 and the first decorative part surface 301 located on the second decorative segment 32 may alternatively be coplanar, with the surface being a curved surface. Certainly, the tailbone end surface 223 and the first decorative part surface 301 located on the second decorative segment 32 may alternatively be roughly curved (with a little deviation allowed). In this embodiment, the tailbone 22 provides protection for the second decorative segment 32 and the decorative part end surface 303 of the decorative part 30, which can prevent the decorative part 30 from curling or damage from an end close to the decorative part end surface 303 that affects aesthetics of the rear cover 1 and user experience. In addition, the smooth transition is present without a gap between the first decorative part surface 301 and the tailbone end surface 223, which can reduce a scratchy feel and further increase aesthetics of the rear cover 1.

Referring to FIG. 4 and FIG. 8, the rear cover 1 further includes a first bonding member 40. The first bonding member 40 is disposed between the first support surface 201 and the second decorative part surface 302 and bonds the support 20 and the decorative part 30, so that the decorative part 30 and the support 20 are fixedly connected. In this embodiment, the first bonding member 40 is hot melt adhesive. Hot melt adhesive melts when heated and can be cured at room temperature with fast bonding performance, high bonding strength, and a wide range of bonding materials. In other embodiments, the first bonding member 40 may alternatively be double-sided adhesive or other glues, provided that fixed connection between the decorative part 30 and the support 20 is implemented.

Referring to FIG. 2 to FIG. 4, the rear cover 1 is mounted to the middle frame 10, with the second support surface 202 of the support 20 facing the first surface 111 of the middle frame 10. The support body 21 is put right against the middle frame body 11 of the middle frame 10, with the tailbone 22 opposite the border frame 13.

The second support segment 212 of the support 20 is stacked with the first side surface 113 of the middle frame 10 and extends towards inside the groove a in a bending direction of the first side surface 113. An end of the second support segment 212 connected to the tailbone 22 is located in the groove a and disposed opposite the avoidance part 12. The tailbone 22 is partially located in the groove a and extends away from the groove a along the border frame inner surface 132 of the border frame 13, with the second tailbone surface 222 opposite the border frame inner surface 132 and the border frame top surface 133. Smooth transition is present between the tailbone end surface 223 and the border frame outer surface 131. This can be understood as that a drop between the tailbone end surface 223 and the border frame outer surface 131 is less than or equal to 0.2 mm, and an included angle between a tangent plane of the tailbone end surface 223 and that of the border frame outer surface 131 is less than or equal to 20 degrees. For example, the drop between the tailbone end surface 223 and the border frame outer surface 131 may alternatively be less than or equal to 0.03 mm. In an implementation, the tailbone end surface 223 and the border frame outer surface 131 may alternatively be coplanar, with the surface being a curved surface and the tailbone end surface 223 extending towards the border frame outer surface 131. Certainly, the tailbone end surface 223 and the border frame outer surface 131 may alternatively be roughly on one curved surface (with a little deviation allowed).

In this embodiment, the tailbone 22 is provided on the support 20 and smooth transition is present between the tailbone end surface 223 and the border frame outer surface 131, so as to ensure smooth transition between the rear cover 1 and the middle frame 10, increasing aesthetics of the housing assembly 100 and reducing a scratchy feel. In addition, with the tailbone 22 provided on the support 20, a gap between the rear cover 1 and the middle frame 10 can be reduced, increasing aesthetics of the housing assembly 100 and improving user experience.

A first gap B is present between the tailbone 22 and the border frame top surface 133 of the border frame 13, with a maximum size of the first gap B in the direction Z being L1. In this embodiment, L1 is 0.5 mm. In other embodiments, L1 may alternatively be less than 0.5 mm or slightly greater than 0.5 mm. A minimum distance between the tailbone 22 and the border frame 13 is 0.03 mm to 0.1 mm. That is, a minimum distance between the border frame top surface 133 and the second tailbone surface 222 is 0.03 mm to 0.1 mm. In an implementation, glue is provided in the first gap B. The glue located in the first gap B bonds the tailbone 22 and the border frame 13, so as to further increase stability of connection between the tailbone 22 and the border frame 13. The glue also closes the first gap B to avoid external dust or moisture into the first gap B and the groove a. In addition, the glue provided in the first gap B can also further reduce a scratchy feel.

Referring to FIG. 2 and FIG. 4, the housing assembly 100 further includes a second bonding member 50. The second bonding member 50 includes a first bonding surface 51 and a second bonding surface 52, where the first bonding surface 51 and the second bonding surface 52 face away from each other. The second bonding member 50 is located between the middle frame 10 and the support 20, with the first bonding surface 51 bonded to the first surface 111 of the middle frame 10 and the second bonding surface 52 bonded to the second support surface 202 of the support 20, so as to implement fixed connection between the support 20 and the middle frame 10, and then implement fixed connection between the rear cover 1 and the middle frame 10. In this embodiment, the second bonding member 50 is foam tape. A substrate of the foam tape includes but is not limited to ethylene-vinyl acetate copolymer (EVA) or polyethylene (PE) foam, and adhesive is applied on two sides of the substrate that face away from each other. A foam substrate is elastic. As foam tape, the second bonding member 50 can play a function of buffering, which can prevent the middle frame 10 and the rear cover 1 from being pressed against each other to cause damage to the middle frame 10 or the rear cover 1. In other embodiments, the second bonding member 50 may alternatively be double-sided adhesive or other glues, provided that fixed connection between the support 20 and the middle frame 10 is implemented.

Figure 9:
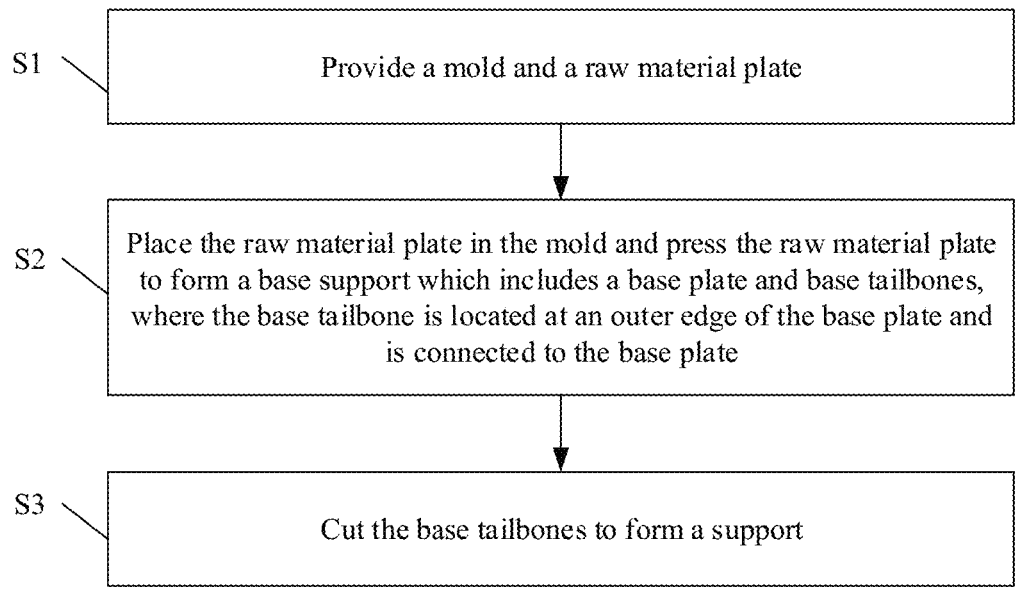
FIG. 9 is a flowchart of manufacturing the support shown in FIG. 6.

Referring to FIG. 9. FIG. 9 is a flowchart of manufacturing the support 20 shown in FIG. 6.

A manufacturing process of the support 20 includes the following steps:

S1: Provide a mold and a raw material plate.

S2: Place the raw material plate in the mold and press the raw material plate to form a base support which includes a base plate and a base tailbone, where the base tailbone is located at an outer edge of the base plate and is connected to the base plate.

S3: Cut the base tailbone to form a support.

Figure 10A:
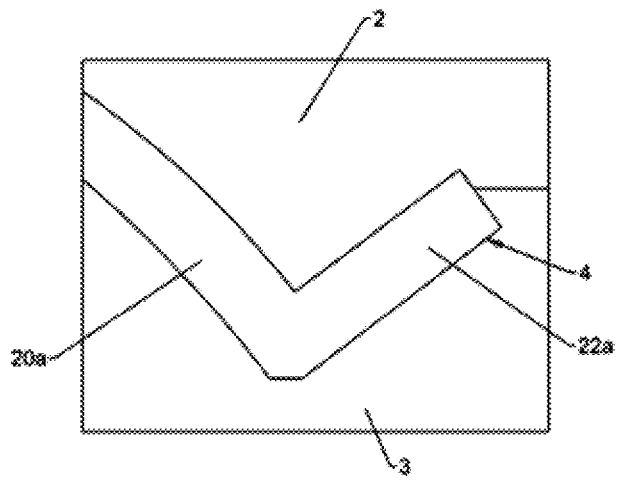
FIG. 10a is a partial structural schematic diagram in a process of manufacturing a base support by using the manufacturing method shown in FIG. 9.

Referring to FIG. 10a. FIG. 10a is a schematic diagram of partial structure in a process of manufacturing a base support by using the manufacturing method shown in FIG. 9.

In S1, the mold includes an upper mold 2 and a lower mold 3, and the upper mold 2 is closed onto the lower mold 3, with a molding groove 4 present between the upper mold 2 and the lower mold 3. The molding groove 4 has the same shape and size as a base support 20a. The raw material plate is a fiber composite plate prepreg. The "fiber composite plate prepreg" mentioned herein refers to a combination of a resin matrix and a reinforcement, made by impregnating continuous fiber with the resin matrix under a specific condition.

In S2, the raw material plate is placed in the molding groove 4, and the mold is heated and pressurized to turn the raw material plate into the base support 20a.

Figure 10B:
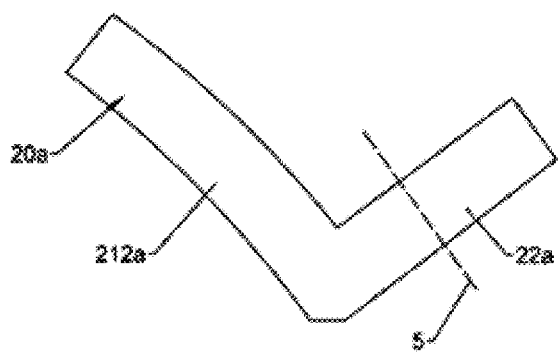
FIG. 10b is a partial structural schematic diagram of the base support manufactured using the manufacturing method shown in FIG. 9.

Referring to FIG. 10b. FIG. 10b is a partial structural schematic diagram of the base support 20a prepared by using the manufacturing method shown in FIG. 9.

The base support 20a includes a base plate and base tailbone 22a. The base plate includes a first base support segment and second base support segments 212a. The second base support segment 212a is connected to an outer edge of the first base support segment. The second base support segments 212a are curved towards a same side as the first base support segment.

The base tailbone 22a is connected to an end of the second base support segment 212a away from the first base support segment. An included angle between an extension direction of the base tailbone 22a and an extension direction of the second base support segments 212a is 60 degrees to 120 degrees. In this embodiment, the included angle between the extension direction of the base tailbone 22a and the extension direction of the second base support segments 212a is 90 degrees, and in other embodiments, the included angle between the extension direction of the base tailbone 22a and the extension direction of the second base support segments 212a may alternatively be greater or less than 90 degrees. The tailbone 22 extends more than 0.6 mm in its extension direction.

Still referring to FIG. 10b, in S3, the base tailbone is cut along a first cutting line 5 to form the base support 20a into the support 20 (as shown in FIG. 6). The base tailbone 22a after cutting forms the tailbone 22 of the support 20. In this embodiment, a numerical control cutting mode is used to cut the base tailbone 22a, ensuring accuracy of cutting. The "numerical control cutting" mentioned herein refers to a workpiece instruction (or program) used to control a machine tool or equipment and is a new mode of control given in a numerical form.

In an implementation, the support 20 may alternatively be formed directly by pressing in one step. In this case, the molding in the mold is consistent with the support 20 in shape and size. This can simplify a preparation process and improve size accuracy of the support 20.

Figure 11:
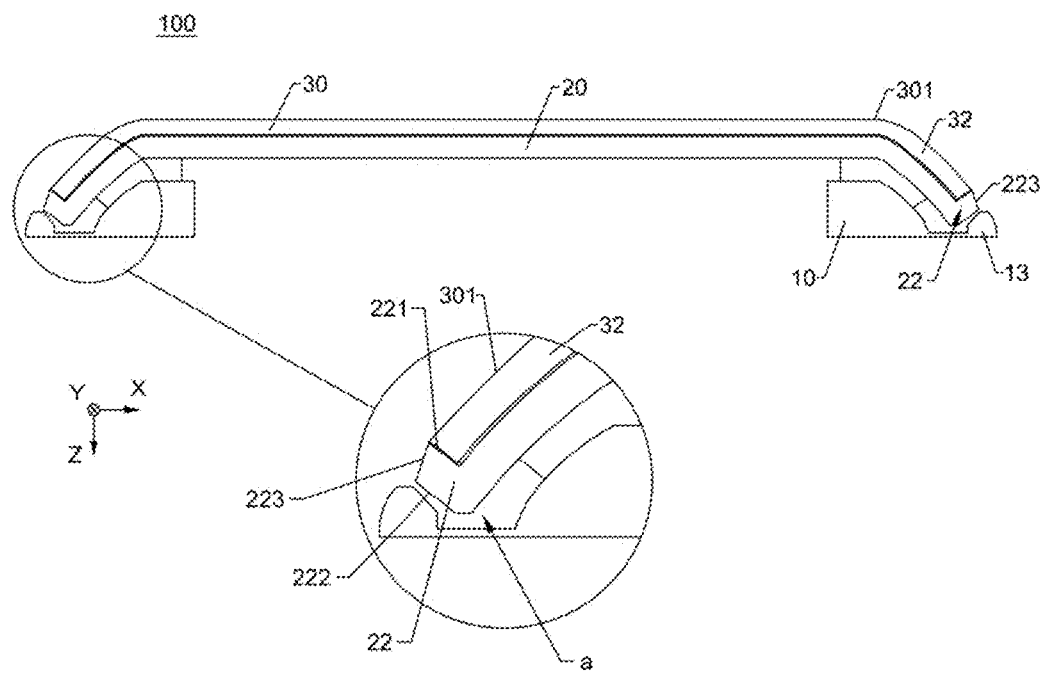
FIG. 11 is a partial structural schematic diagram of a second implementation of the housing assembly according to Embodiment 1 of this application.

Referring to FIG. 11, FIG. 11 is a partial structural schematic diagram of a second implementation of the housing assembly 100 according to Embodiment 1 of this application.

This implementation differs from the implementation shown in FIG. 2 in that the tailbone end surface 223 slopes in a direction from the first tailbone surface 221 towards the second tailbone surface 222, and that an included angle between the tailbone end surface 223 and the first tailbone surface 221 is an acute angle. In other words, the tailbone end surface 223 slopes relative to the first decorative part surface 301 towards inside the groove a. A protruding part of the tailbone 22 may also be reduced while the tailbone 22 provides protection for the decorative part 30 and the decorative part end surface 303 of the second decorative segments 32, which further prevents the tailbone end surface 223 of the tailbone 22 from giving a scratchy feel, thereby improving user experience.

Figure 12:
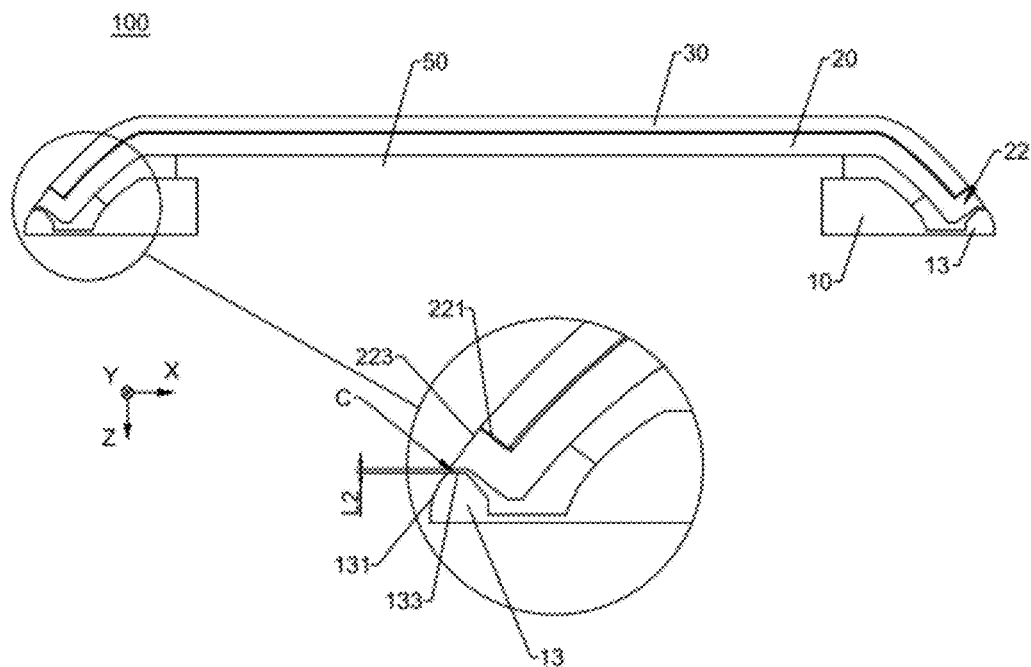
FIG. 12 is a partial structural schematic diagram of a third implementation of the housing assembly according to Embodiment 1 of this application.
Figure 13:
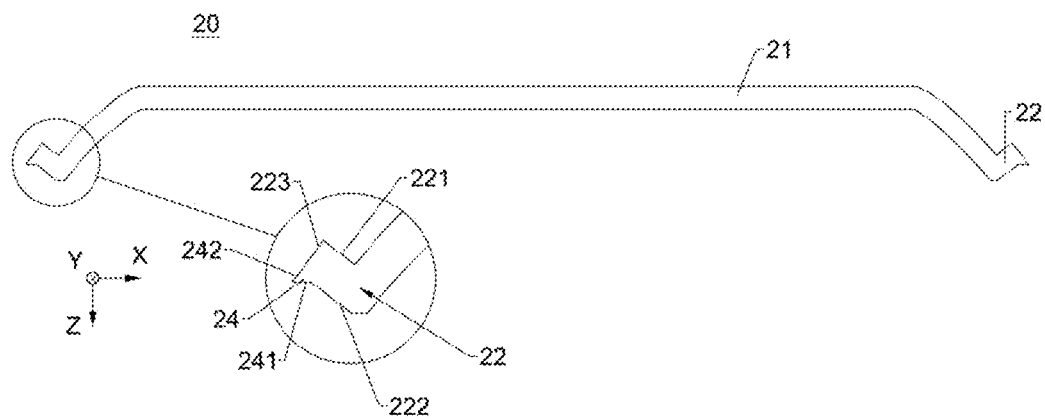
FIG. 13 is a schematic structural diagram of a support in the housing assembly shown in FIG. 12.

Referring to FIG. 12 and FIG. 13, FIG. 12 is a partial structural schematic diagram of a third implementation of the housing assembly 100 according to Embodiment 1 of this application, and FIG. 13 is a schematic structural diagram of the support 20 in the housing assembly 100 shown in FIG. 12.

This implementation differs from the first implementation shown in FIG. 2 in that the tailbone 22 further include extensions 24. The extension 24 is connected to the protrusion c of the tailbone 22 and extends from the protrusion c towards a direction away from the support body 21. In other words, the extension 24 is protrusively formed on the second tailbone surface 222 of the tailbone 22. The extension 24 includes an extension bottom surface 241 and an extension side surface 242. The extension side surface 242 is connected to the tailbone end surface 223, with the extension side surface 242 and the tailbone end surface 223 facing a same direction and flush with each other. This can be understood as that the extension side surface 242 and the tailbone end surface 223 are on a same surface.

After the support 20 is assembled with the middle frame 10, the extension bottom surface 241 is parallel to the border frame top surface 133, with the extension 24 extending towards the border frame 13. Certainly, the extension bottom surface 241 may alternatively have a tilt angle (within a tolerance range) relative to the border frame top surface 133. Smooth transition is present between the extension side surface 242 and the border frame outer surface 131. This can be understood as that a drop between the extension side surface 242 and the border frame outer surface 131 is less than or equal to 0.2 mm, and an included angle between a tangent plane of the extension side surface 242 and that of the border frame outer surface 131 is less than or equal to 20 degrees. For example, the drop between the extension side surface 242 and the border frame outer surface 131 may alternatively be less than or equal to 0.03 mm. In an implementation, the extension side surface 242 and the border frame outer surface 131 may alternatively be coplanar. A second gap C is present between the extension 24 and the border frame top surface 133 of the border frame 13, and the second gap C is the gap between the extension bottom surface 241 and the border frame top surface 133. A maximum size of the second gap C in the direction Z is L2. L2 is 0.05 mm to 0.1 mm. In this embodiment, L2 is 0.07 mm.

Figure 14A:
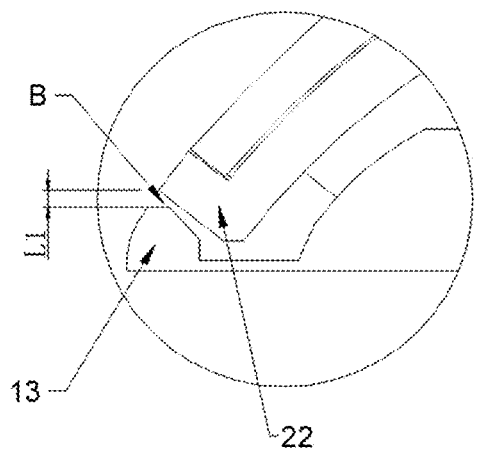
FIG. 14a is a partial structural schematic diagram of the housing assembly shown in FIG. 2.
Figure 14B:
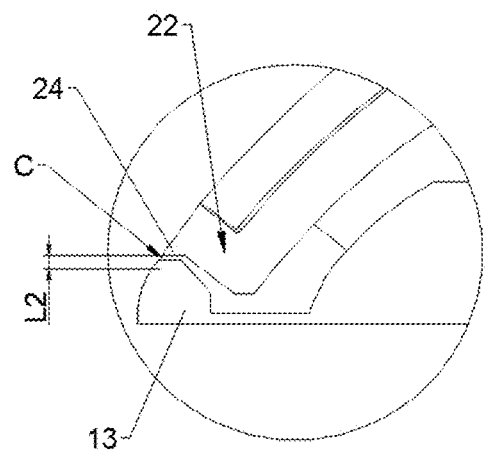
FIG. 14b is a partial structural schematic diagram of the housing assembly shown in FIG. 12.

As shown in FIGS. 14a and 14b, FIG. 14a is a partial structural schematic diagram of the housing assembly 100 shown in FIG. 2, and FIG. 14b is a partial structural schematic diagram of the housing assembly 100 shown in FIG. 12. In this application, the provided extensions 24 can further reduce a gap between the support 20 and the border frame 13 on a basis of the embodiment shown in FIG. 2, increasing aesthetics of the housing assembly 100 and reducing dust and moisture into the gap between the support 20 and the border frame 13.

In this embodiment, a manufacturing process of the support 20 includes the following steps:

(1) Provide a mold and a raw material plate.
(2) Place the raw material plate in the mold and press the raw material plate to form a base support 20a. The base support 20a includes a base plate and base tailbone 22a, where the base tailbone 22a are separately located at two opposite ends of the base plate and are connected to the base plate.
(3) Cut the base tailbone 22a to form the support 20.

Figure 15A:
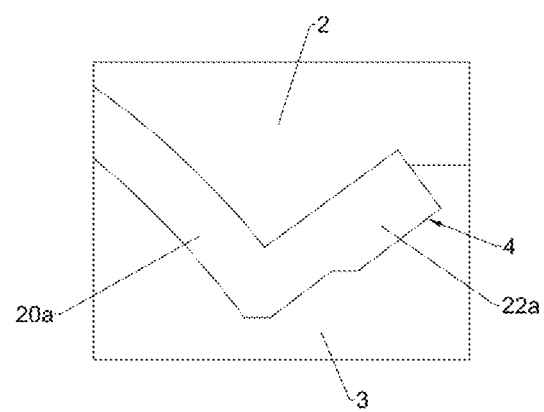
FIG. 15a is a partial structural schematic diagram in a process of preparing the support shown in FIG. 13.
Figure 15B:
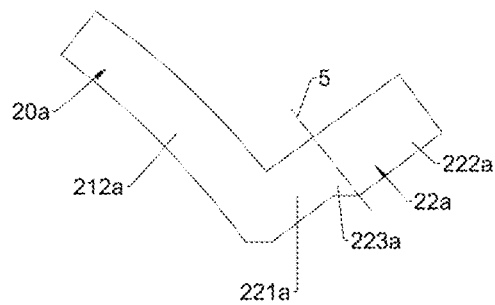
FIG. 15b is a partial structural schematic diagram of a base support formed in the process of preparing the support shown in FIG. 13.

Referring to FIG. 15a and FIG. 15b, FIG. 15a is a partial structural schematic diagram in a process of preparing the support 20 shown in FIG. 13, and FIG. 15b is a partial structural schematic diagram of a base support 20a formed in the process of preparing the support 20 shown in FIG. 13.

In step (1), the mold includes an upper mold 2 and a lower mold 3, and the upper mold 2 is closed onto the lower mold 3, with a molding groove 4 present between the upper mold 2 and the lower mold 3. The molding groove 4 has the same shape and size as the base support 20a. The raw material plate is a fiber composite plate prepreg. The "fiber composite plate prepreg" mentioned herein refers to a combination of a resin matrix and a reinforcement, made by impregnating continuous fiber with the resin matrix under a specific condition.

The base support 20a includes a base plate and base tailbone 22a. The base plate includes a first base support segment and second base support segments 212a. The second base support segments 212a are separately connected to outer edges of the first base support segment. The second base support segments 212a are curved towards a same side as the first base support segment.

The base tailbone 22a includes a first part 221a, a second part 222a and a first connecting part 223a, where the first connecting part 223a is connected between the first part 221a and the second part 222a, a thickness of the first part 221a is less than that of the second part 222a, and a thickness of the first connecting part 223a increases gradually from the first part 221a to the second part 222a. An end of the first connecting part 223a connected to the first part 221a has the same thickness as the first part 221a. An end of the first connecting part 223a connected to the second part 222a has the same thickness as the second part 222a. The first part 221a is fixedly connected to the second base support segments 212a, with an included angle between an extension direction of the base tailbone 22a and an extension direction of the second base support segments 212a being 60 degrees to 120 degrees. In this embodiment, the included angle between the extension direction of the base tailbone 22a and the extension direction of the second base support segments 212a is 90 degrees.

Still referring to FIG. 15b, in step (3), the base tailbone 22a is cut along a first cutting line 5 to form the base support 20a into the support 20 (as shown in FIG. 13), where the first cutting line 5 is perpendicular to the extension direction of the base tailbone 22a. That is, the tailbone 22 is obtained after the second part 222a is cut off in step (3).

In this embodiment, a numerical control cutting mode is used to cut the base tailbone 22a, ensuring accuracy of cutting. The "numerical control cutting" mentioned herein refers to a workpiece instruction (or program) used to control a machine tool or equipment and is a new mode of control given in a numerical form.

In an implementation, the support 20 may alternatively be formed directly by pressing in one step. In this case, the molding in the mold is consistent with the support 20 in shape and size. This can simplify a preparation process and improve size accuracy of the support 20.

Figure 16A:
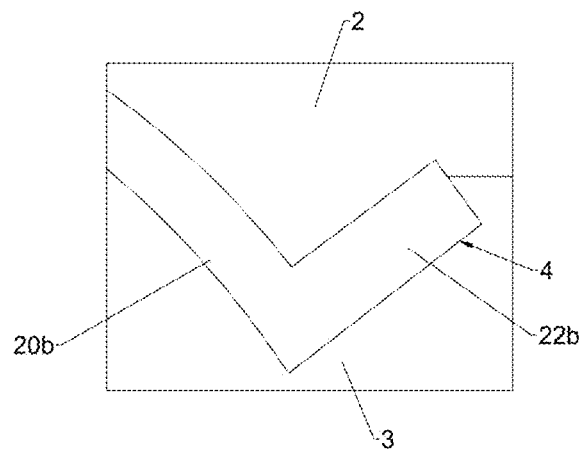
FIG. 16a is a partial structure schematic diagram in a process of preparing the support shown in FIG. 13 by using another manufacturing method.
Figure 16B:
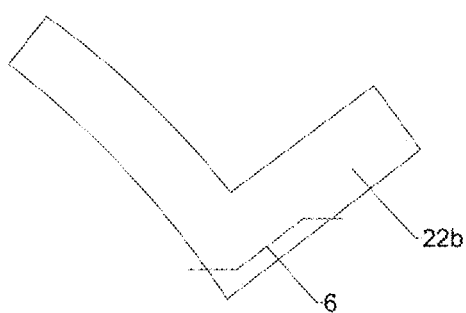
FIG. 16b is a partial structure schematic diagram of a to-be-cut component formed in the process of preparing the support shown in FIG. 13 by using the another manufacturing method.

Referring to FIG. 16a and FIG. 16b. FIG. 16a is a schematic diagram of partial structure in a process of preparing the support 20 shown in FIG. 13 by using another manufacturing method, and FIG. 16b is a schematic diagram of partial structure of a to-be-cut component 20b formed in the process of preparing the support 20 shown in FIG. 13 by using the another manufacturing method.

As shown in FIG. 16a, the upper mold 2 and the lower mold 3 are used to press the raw material plate to form the to-be-cut component 20b.

As shown in FIG. 16b, the to-be-cut component 20b includes a second base plate and to-be-cut tailbone 22b. The second base plate has the same structure as the first base plate of the base support 20a in the foregoing embodiment. The to-be-cut tailbone 22b are connected to outer edges of the second base plate, with extension directions of the to-be-cut tailbone 22b located on a same side of the second base plate. In this embodiment, thicknesses of the to-be-cut tailbone 22b both are greater than a thickness of the second base plate.

In step (3), the to-be-cut tailbone 22b is first cut along a third cutting line 6 to form a base support 20a (as shown in FIG. 16b), and the base tailbone 22a of the base support 20a is formed after the to-be-cut tailbone 22b is cut. The third cutting line 6 includes three consecutive cutting line sections, with a first section of the third cutting line 6 parallel to the direction X, a second section of the third cutting line 6 parallel to an extension direction of the base tailbone 22a, and a third section of the third cutting line 6 parallel to the first section of cutting line.

As shown in FIG. 16b, the base support 20a is then cut as follows: The base tailbone 22a is cut along a first cutting line 5 to form the base support 20a into the support 20 (as shown in FIG. 13).

Figure 17:
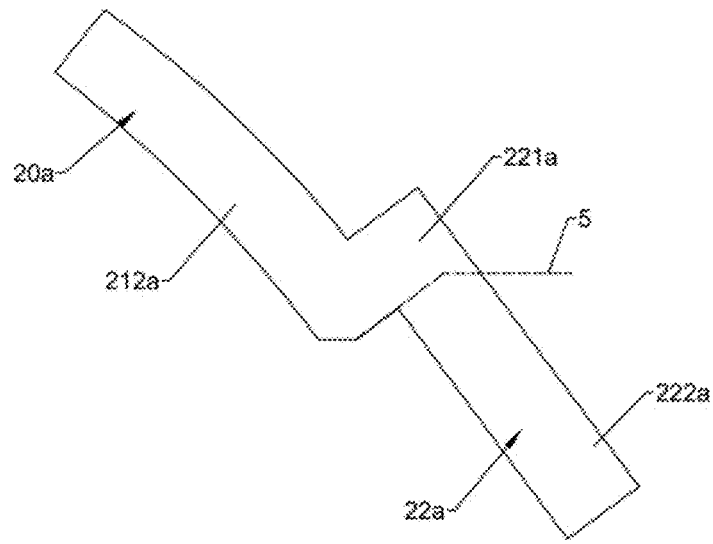
FIG. 17 is a schematic structural diagram of a base support formed in a process of preparing the support shown in FIG. 13 by using a third manufacturing method.

Referring to FIG. 17, FIG. 17 is a schematic structural diagram of a base support 20a formed in a process of preparing the support 20 shown in FIG. 13 by using a third manufacturing method.

In this embodiment, the base support 20a includes a base plate and a base tailbone 22a. The base tailbone 22a includes a first part 221a and a second part 222a, where the first part 221a and the second part 222a are fixedly connected, with an included angle between the first part 221a and the second part 222a being 90 degrees. The first part 221a is fixedly connected to an end of the base plate, with an included angle between an extension direction of the first part 221a and a surface of the base plate being 90 degrees and the second part 222a extending away from the base plate.

The base tailbone 22a are cut to form the support 20 (as shown in FIG. 13). A first cutting line 5 includes two consecutive cutting line sections. A first section of the first cutting line 5 is located between the first part 221a and the second part 222a, with a first section of the first cutting line 5 parallel to the extension direction of the first part 221a. A second section of the first cutting line 5 is on the second part 222a and parallel to the direction X.

Figure 18:
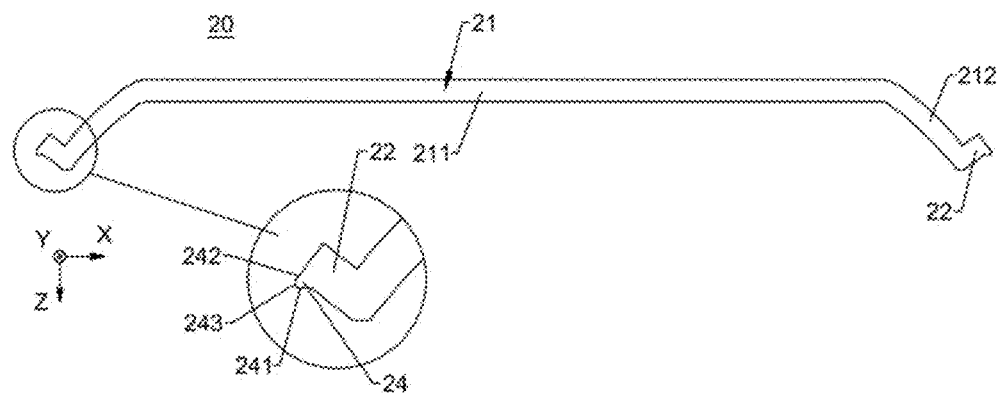
FIG. 18 is a schematic structural diagram of a fourth implementation of a support in the housing assembly according to Embodiment 1 of this application.

Referring to FIG. 18, FIG. 18 is a schematic structural diagram of a fourth implementation of a support 20 in the housing assembly 100 according to Embodiment 1 of this application.

This implementation differs from the third implementation shown in FIG. 12 in that the extension 24 further includes a connecting surface 243, the connecting surface 243 being connected between the extension side surface 242 and the extension bottom surface 241. In this embodiment, the connecting surface 243 is a plane and is parallel to the direction Z. In other embodiments, the connecting surface 243 may alternatively be a curved surface. Alternatively, the connecting surface 243 may be a chamfer. The provided connecting surface 243 can prevent the extension side surface 242 and the extension bottom surface 241 from being directly connected to form a sharp angle that results in a scratchy feel and affects user experience.

Figure 19:
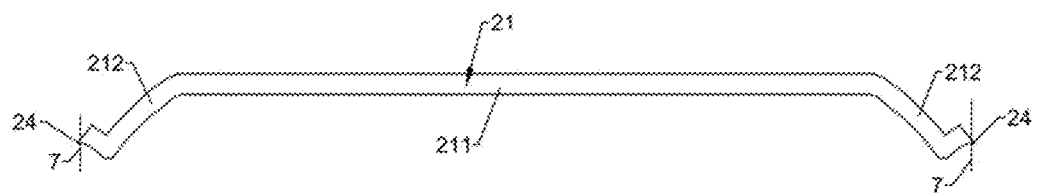
FIG. 19 is a schematic structural diagram of a preparation process of the support shown in FIG. 18.

Further reference may be made to FIG. 19, which is a schematic structural diagram of a preparation process of the support 20 shown in FIG. 18.

The support 20 shown in this embodiment can be obtained by further cutting the support 20 shown in FIG. 13 along first auxiliary cutting lines 7. The first auxiliary cutting line 7 is on the extension 24 and parallel to the direction Z, with the first auxiliary cutting line 7 penetrating the extension side surface 242 and the extension bottom surface 241 of the extension 24. A cut surface after the cutting along the first auxiliary cutting line 7 is the connecting surface 243.

Figure 20:
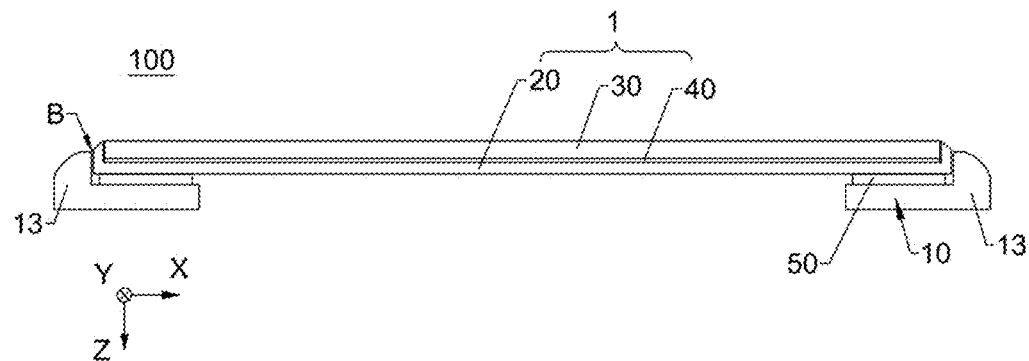
FIG. 20 is a partial structural schematic diagram of a housing assembly according to Embodiment 2 of this application.
Figure 21:
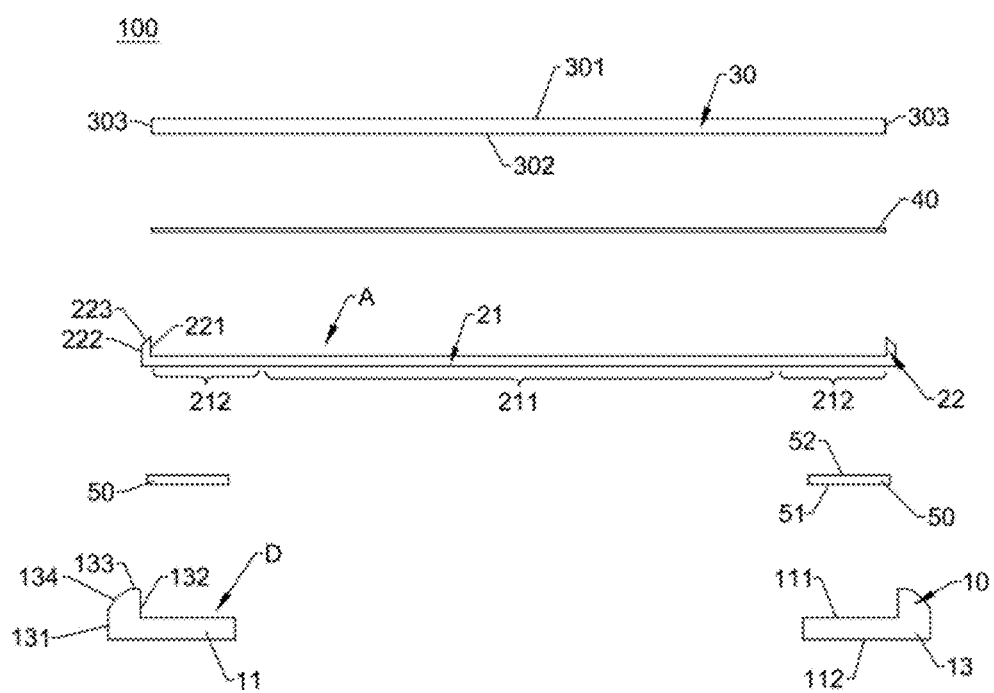
FIG. 21 is a schematic exploded structural diagram of the housing assembly shown in FIG. 20.

Referring to FIG. 20 and FIG. 21. FIG. 20 is a partial structural schematic diagram of a housing assembly 100 according to Embodiment 2 of this application, and FIG. 21 is a schematic exploded structural diagram of the housing assembly shown in FIG. 20.

In this embodiment, a middle frame 10 is made of the same material as the middle frame 10 in Embodiment 1. The middle frame 10 includes a middle frame body 11 and a border frame 13. The middle frame body 11 is a rectangular plate. The middle frame body 11 includes a first surface 111 and a second surface 112, the first surface 111 and the second surface 112 facing away from each other. The border frame 13 is connected to an outer edge of the middle frame body 11, with the border frame 13 extending in a positive direction of the Z axis. The border frame 13 includes a border frame outer surface 131, a border frame inner surface 132, and a border frame top surface 133. The border frame outer surface 131 and the border frame inner surface 132 face away from each other, both of which are parallel to the direction Z. The border frame outer surface 131 is perpendicularly connected to the second surface 112 of the middle frame body 11, and the border frame inner surface 132 is perpendicularly connected to the first surface 111 of the middle frame body 11. The border frame top surface 133 is fixedly connected to an end of the border frame inner surface 132 away from the middle frame body 11 and extends from the border frame inner surface 132 towards the border frame outer surface 131. An included angle between the border frame top surface 133 and the border frame inner surface 132 is 90 degrees. Certainly, the included angle between the border frame top surface 133 and the border frame inner surface 132 may alternatively be slightly greater or less than 90 degrees. The border frame 13 further includes a border arc surface 134, where the border arc surface 134 is connected between the border frame top surface 133 and the border frame outer surface 131. Herein, the border arc surface 134 can be understood as part of the border frame top surface 133.

The border frame 13 and the middle frame body 11 together enclose an accommodating recess D. The first surface 111 is a bottom wall of the accommodating recess D and the border frame inner surface 132 is a side wall of the accommodating recess D. The accommodating recess D is configured to mount a rear cover 1.

In this embodiment, a support 20 is made of the same material as the support 20 in Embodiment 1. The support 20 includes a support body 21 and a tailbone 22.

Figure 22:
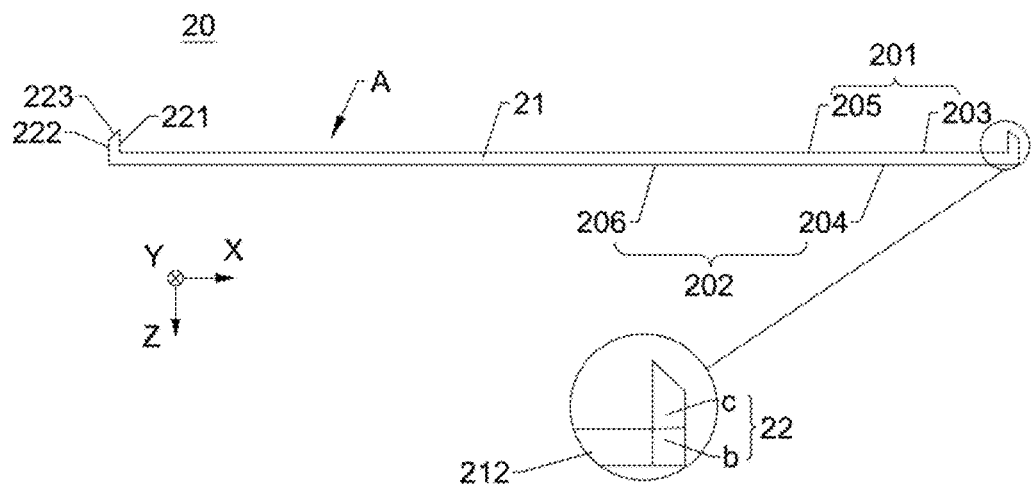
FIG. 22 is a schematic structural diagram of a support in the housing assembly shown in FIG. 21.

Further reference may be made to FIG. 22. FIG. 22 is a schematic structural diagram of the support 20 in the housing assembly 100 shown in FIG. 21. The support body 21 includes a first support segment 211 and second support segments 212. The second support segment 212 is connected to an outer edge of the first support segment 211. The first support segment 211 includes a first surface 203 and a second surface 204, the first surface 203 and the second surface 204 facing away from each other. The second support segment 212 includes a third surface 205 and a fourth surface 206, the third surface 205 and the fourth surface 206 facing away from each other. The first surface 203 and the third surface 205 together form the first support surface 201, with the first support surface 201 being a plane. The second surface 204 and the fourth surface 206 together form the second support surface 202, with the second support surface 202 being a plane. That is, the support body 21 is of a rectangular plate structure.

The tailbone 22 is connected to an outer edge of the support body 21, with the tailbone 22 perpendicular to the first support surface 201. That is, the tailbone 22 extends in a positive direction of the Z axis. The tailbone 22 includes a tailbone body b and a protrusion c. The tailbone body b is connected to the second support segment 212, and the protrusion c is connected to the tailbone body b, with the protrusion c protruding from the third surface 205. It should be noted that, in this embodiment, the support body 21, the tailbone body b and the protrusion c are an integrally formed component. Dotted lines in FIG. 22 are merely for ease of description and are actually not present.

The tailbone 22 further includes a first tailbone surface 221, a second tailbone surface 222 and a tailbone end surface 223. The first tailbone surface 221 and the second tailbone surface 222 face away from each other, with a height of the second tailbone surface 222 in the direction Z lower than that of the first tailbone surface 221 in the direction Z. In other words, an end of the second tailbone surface 222 away from the support body 21 is located in a negative direction of the Z axis of an end of the first tailbone surface 221 away from the support body 21. The tailbone end surface 223 is connected between the first tailbone surface 221 and the second tailbone surface 222. In this embodiment, the tailbone end surface 223 is a tilted surface, with an included angle between the tailbone end surface 223 and the first tailbone surface 221 being an acute angle and an included angle between the tailbone end surface 223 and the second tailbone surface 222 being an obtuse angle. That is, the tailbone end surface 223 tilts from the first tailbone surface 221 towards the second tailbone surface 222. In other embodiments, the tailbone end surface 223 may alternatively be a curved surface.

The support body 21 and the tailbone 22 together enclose mounting recesses A. The first support surface 201 is a bottom wall of the mounting recess A. and the first tailbone surface 221 of the tailbone 22 is a side wall of the mounting recess A. The mounting recesses A are configured to mount a decorative part 30.

Still referring to FIG. 21, the decorative part 30 is made of the same material as the decorative part 30 in Embodiment 1. In this embodiment, the decorative part is of a flat and straight plate structure. The decorative part 30 includes a first decorative part surface 301, a second decorative part surface 302, and decorative part end surfaces 303. The first decorative part surface 301 and the second decorative part surface 302 face away from each other, both of which are parallel to the direction X and direction Y. The decorative part end surface 303 is located at an outer edge of the first decorative part surface 301 and connected between the first decorative part surface 301 and the second decorative part surface 302. In this embodiment, the decorative part end surface 303 is perpendicular to the direction X and direction Y. That is, the decorative part end surface 303 is perpendicular to both the first decorative part surface 301 and the second decorative part surface 302.

Referring to FIG. 20 and FIG. 21, the decorative part 30 is mounted in the mounting recesses A of the support 20 and is fixedly connected to the support 20. The second decorative part surface 302 of the decorative part 30 faces the first support surface 201 of the support 20, and the decorative part end surface 303 is connected to the first tailbone surface 221. In this embodiment, the decorative part end surface 303 abuts against the first tailbone surface 221. In another implementation, the decorative part end surface 303 and the first tailbone surface 221 may alternatively be indirectly connected by a bonding agent or other means. Alternatively, a very small gap (within a tolerance range) may be present between the decorative part end surface 303 and the first tailbone surface 221.

In this embodiment, an end of the tailbone end surface 223 connected to the first tailbone surface 221 is parallel to the first decorative part surface 301 in the direction Z, and the tailbone 22 provides protection for the decorative part 30 and the decorative part end surface 303, which can prevent the decorative part 30 from curling or damage from an end close to the decorative part end surface 303 that affects aesthetics of the rear cover 1 and user experience. In addition, no gap or a very small gap (within a tolerance range) is present between the decorative part end surface 303 and the first tailbone surface 221, which can prevent dust and moisture from entering between the support 20 and the decorative part 30 to affect assembly stability of the rear cover 1. In addition, smooth transition is present without a gap between the first decorative part surface 301 and the tailbone end surface 223, which can reduce a scratchy feel and further increase aesthetics of the rear cover 1.

Still referring to FIG. 20 and FIG. 21, the rear cover 1 further includes a first bonding member 40. The first bonding member 40 is disposed between the first support surface 201 and the second decorative part surface 302 and bonds the decorative part 30 and the support 20, so that the decorative part 30 and the support 20 are fixedly connected. In this embodiment, the first bonding member 40) is hot melt adhesive. Hot melt adhesive melts when heated and can be cured at room temperature with fast bonding performance, high bonding strength, and a wide range of bonding materials. In other embodiments, the first bonding member 40 may alternatively be double-sided adhesive or other glues, provided that fixed connection between the decorative part 30 and the support 20 is implemented.

The rear cover 1 is mounted in the accommodating recess D of the middle frame 10 and is fixedly connected to the middle frame 10. The support body 21 is put right against the middle frame body 11 of the middle frame 10, with the tailbone 22 opposite the border frame 13. The second support surface 202 of the support 20 faces the first surface 111 of the middle frame 10, and the second tailbone surface 222 faces the border frame inner surface 132.

In this embodiment, with the tailbone 22 provided on the support 20, a gap between the rear cover 1 and the middle frame 10 can be reduced, increasing aesthetics of the housing assembly 100.

A first gap B is present between the second tailbone surface 222 of the tailbone 22 and the border frame inner surface 132 of the border frame 13, with a maximum size of the first gap B in the direction X being 0.5 mm. In other embodiments, the maximum size of the first gap B in the direction X may alternatively be less than 0.5 mm or slightly greater than 0.5 mm.

In an implementation, glue is provided in the first gap B. The glue located in the first gap B bonds the tailbone 22 and the border frame 13, so as to further increase stability of connection between the tailbone 22 and the border frame 13. The glue also closes the first gap B to avoid external dust or moisture into the first gap B. In addition, the glue provided in the first gap B can also further reduce a scratchy feel.

Still referring to FIG. 20 and FIG. 21, the housing assembly 100 further includes a second bonding member 50. The second bonding member 50 includes a first bonding surface 51 and a second bonding surface 52, where the first bonding surface 51 and the second bonding surface 52 face away from each other. The second bonding member 50 is located between the middle frame 10 and the support 20, with the first bonding surface 51 bonded to the first surface 111 of the middle frame 10 and the second bonding surface 52 bonded to the second support surface 20 of the support 20, so that the support 20 and the middle frame 10 are fixedly connected, and then the rear cover 1 and the middle frame 10 are fixedly connected.

In this embodiment, the second bonding member 50 is foam tape. A substrate of the foam tape includes but is not limited to ethylene-vinyl acetate copolymer (EVA) or polyethylene (PE) foam, and adhesive is applied on two sides of the substrate that face away from each other. A foam substrate is elastic. As foam tape, the second bonding member 50 can play a function of buffering, which can prevent the middle frame 10 and the rear cover 1 from being pressed against each other to cause damage to the middle frame 10 or the rear cover 1. In other embodiments, the second bonding member 50 may alternatively be double-sided adhesive or other glues, provided that fixed connection between the support 20 and the middle frame 10 is implemented.

Figure 23:
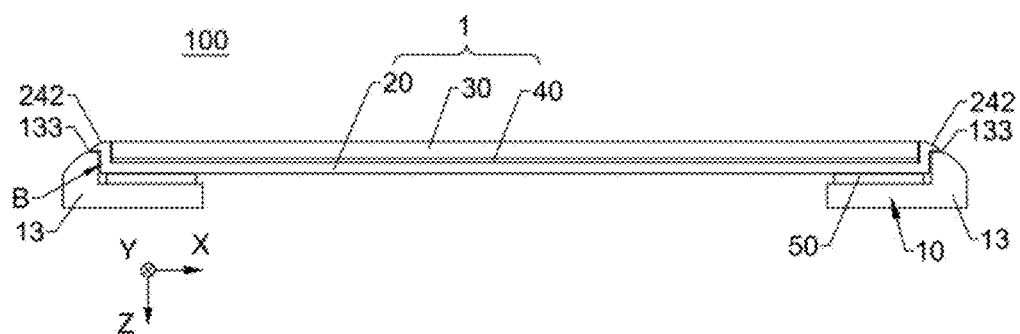
FIG. 23 is a partial structural schematic diagram of another implementation of the housing assembly according to Embodiment 2 of this application.
Figure 24:
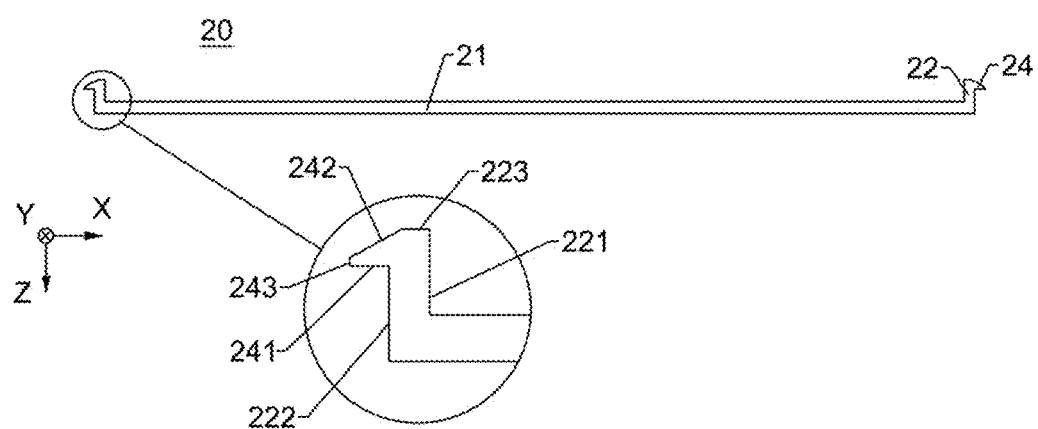
FIG. 24 is a schematic structural diagram of a support in the housing assembly shown in FIG. 23.

Referring to FIG. 23 and FIG. 24. FIG. 23 is a schematic diagram of partial structure of a housing assembly 100 according to another implementation of Embodiment 2 of this application. FIG. 24 is a schematic structural diagram of a support 20 in the housing assembly 100 shown in FIG. 23.

This housing assembly 100 differs from the housing assembly 100 shown in FIG. 20 in that the tailbone 22 further includes an extension 24, with the extension 24 connected to the protrusion c and extending from the protrusion c towards a direction away from the support body 21. The tailbone 22 includes a first tailbone surface 221, a second tailbone surface 222 and a tailbone end surface 223. The first tailbone surface 221 and the second tailbone surface 222 face away from each other and flush with each other in the direction Z. The tailbone end surface 223 is connected to the first tailbone surface 221 and parallel to the direction X. The extension 24 is protrusively formed on the second tailbone surface 222 of the tailbone 22. The extension 24 includes an extension bottom surface 241 and an extension side surface 242. The extension side surface 242 is connected to the tailbone end surface 223, and opposite ends of the extension bottom surface 241 are connected to the extension side surface 242 and the second tailbone surface 222 respectively.

In this embodiment, a size of the extension bottom surface 241 in the direction X is 0.08 mm to 0.2 mm. That is, a maximum size of the extension 24 protruding from the second tailbone surface 222 is 0.08 mm to 0.2 mm. When the rear cover 1 is mounted to the middle frame 10, the extension 24 extends from the tailbone 22 to the border frame 13, with the extension bottom surface 241 opposite the border frame top surface 133. The extension 24 provides shielding for the first gap B, which can avoid external dust or moisture into the first gap B to affect stability of connection between the rear cover 1 and the middle frame 10. In addition, aesthetics of the housing assembly 100 can also be increased.

In this implementation, the extension side surface 242 is a tilted surface. In another implementation, the extension side surface 242 may alternatively be a curved surface. When the extension side surface 242 is a curved surface, the extension side surface 242 smoothly transits to the border arc surface 134. This can be understood as that a drop between the extension side surface 242 and the border arc surface 134 is less than or equal to 0.2 mm, and an included angle between a tangent plane of the extension side surface 242 and that of the border arc surface 134 is less than or equal to 20 degrees. For example, the drop between the extension side surface 242 and the border arc surface 134 may alternatively be less than or equal to 0.03 mm. In an implementation, the extension side surface 242 and the border arc surface 134 may alternatively be coplanar, with the surface being a curved surface and the extension side surface 242 extending towards the border arc surface 134 and smoothly transiting to the border arc surface 134. This can increase aesthetics and smoothness of the housing assembly 100, reduce a scratchy feel from the housing assembly 100, and improve user experience. Certainly, the extension side surface 242 and the border arc surface 134 may alternatively be roughly on one curved surface (with a little deviation allowed).

In an implementation, the extension 24 further includes a connecting surface 243. The connecting surface 243 is connected between the extension side surface 242 and the extension bottom surface 241. In this embodiment, the connecting surface 243 is a plane and is parallel to the direction Z. In other embodiments, the connecting surface 243 may alternatively be a curved surface. Alternatively, the connecting surface 243 may be a chamfer. The provided connecting surface 243 can prevent the extension side surface 242 and the extension bottom surface 241 from being directly connected to form a sharp angle that results in a scratchy feel and affects user experience.

In this embodiment, a manufacturing process of the support 20 includes the following steps:
(1) Provide a mold and a raw material plate.
(2) Place the raw material plate in the mold and press the raw material plate to form a base support. The base support includes a base plate and a base tailbone, where the base tailbone is located at an outer edge of the base plate and is connected to the base plate.
(3) Cut the base tailbone to form a support 20.

Figure 25A:
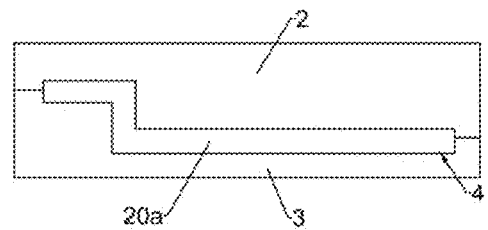
FIG. 25a is a partial structural schematic diagram in a process of preparing the support shown in FIG. 24.
Figure 25B:
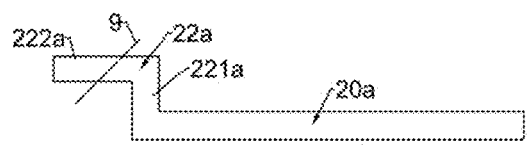
FIG. 25b is a partial structural schematic diagram of a base support formed in the process of preparing the support shown in FIG. 24.

Referring to FIG. 25a and FIG. 25b, FIG. 25a is a partial structural schematic diagram in a process of preparing the support 20 shown in FIG. 24, and FIG. 25b is a partial structural schematic diagram of a base support 20a formed in the process of preparing the support 20 shown in FIG. 24.

As shown in FIG. 25a, in step (1), the mold includes an upper mold 2 and a lower mold 3, and the upper mold 2 is closed onto the lower mold 3, with a molding groove 4 present between the upper mold 2 and the lower mold 3. The molding groove 4 has the same shape and size as the base support 20a. The raw material plate is a fiber composite plate prepreg. The "fiber composite plate prepreg" mentioned herein refers to a combination of a resin matrix and a reinforcement, made by impregnating continuous fiber with the resin matrix under a specific condition.

As shown in FIG. 25b, the base support 20a includes a base plate and a base tailbone 22a. The base tailbone 22a includes a first part 221a and a second part 222a, where the first part 221a and the second part 222a are connected, with an included angle between the first part 221a and the second part 222a being 90 degrees. The first part 221a is fixedly connected to an end of the base plate, with an included angle between an extension direction of the first part 221a and a surface of the base plate being 90 degrees, an extension direction of the second part 222a being parallel to the surface of the base plate, and the second part 222a extending away from the base plate.

In step (3), the base tailbone 22a is cut along a first cutting line 9 to form the base support 20a into the support 20 (as shown in FIG. 24), where the first cutting line 9 is on the second part 222a, and an included angle between the first cutting line 9 and a positive direction of the X axis is an acute angle. The base tailbone 22a is cut to form the tailbone 22 of the support 20.

In this embodiment, a numerical control cutting mode is used to cut the base tailbone 22a, ensuring accuracy of cutting. The "numerical control cutting" mentioned herein refers to a workpiece instruction (or program) used to control a machine tool or equipment and is a new mode of control given in a numerical form.

In an implementation, in step (3), after the base tailbone 22a is cut along the first cutting line 9, the base tailbone may be further cut along a first auxiliary cutting line, so that the extension 24 of the obtained support 20 includes the connecting surface 243.

In an implementation, the support 20 may alternatively be formed directly by pressing in one step. In this case, the molding in the mold is consistent with the support 20 in shape and size. This can simplify a preparation process and improve size accuracy of the support 20.

Figure 26A:
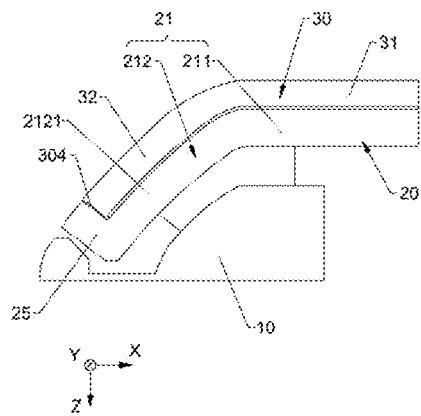
FIG. 26a is a partial structural schematic diagram of a housing assembly according to Embodiment 3 of this application.
Figure 26B:
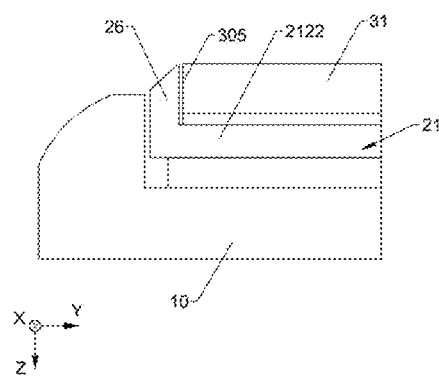
FIG. 26b is a partial structural schematic diagram of the housing assembly shown in FIG. 26a from another perspective.

Referring to FIG. 26a and FIG. 26b. FIG. 26a is a partial structural schematic diagram of a housing assembly according to Embodiment 3 of this application, and FIG. 26b is a partial structural schematic diagram of the housing assembly shown in FIG. 26a from another perspective.

This embodiment differs from the embodiment shown in FIG. 2 in that the support 20 includes the support body 21 and tailbone 22, where the tailbone 22 include two first sub-tailbones 25 and two second sub-tailbones 26. The second support segments 212 include two first sub-support segments 2121 and two second sub-support segments 2122, with the first sub-support segments 2121 curved relative to the first support segment 211. That is, two opposite ends of the second support segments 212 in the direction X are curved relative to the first support segment 211 towards the middle frame 10, while two opposite ends of the second support segments 212 in the direction Y are flat and straight. The two first sub-support segments 2121 are connected to two opposite ends of the first support segment 211 in the direction X, and one such first sub-tailbone 25 is connected to an end of one such first sub-support segment 2121 away from the first support segment 211. The two second sub-support segments 2122 are connected to two opposite ends of the first support segment 211 in the direction Y, and one such second sub-tailbone 26 is connected to an end of one such second sub-support segment 2122 away from the first support segment 211. The two first sub-tailbones 25 and the two second sub-tailbones 26 are connected head to tail to form the tailbone 22, and the two first sub-tailbones 25 and the two second sub-tailbones 26 are integrally formed. In this embodiment, each first sub-tailbone 25 may be connected to an adjacent second sub-tailbone 26 through a chamfer, so that the first sub-tailbone 25 transits smoothly to the adjacent second sub-tailbone 26.

The decorative part 30 includes a first decorative segment 31 and second decorative segments 32, where the second decorative segments 32 are connected to outer edges of the first decorative segment 31 respectively, with the second decorative segments 32 located on two opposite ends of the first decorative segment 31 in the direction X being curved relative to the first decorative segment 31, and the second decorative segments 32 located on two opposite ends of the first decorative segment 31 in the direction Y being flat and straight. The decorative part 30 includes two third end surfaces 304 and two fourth end surfaces 305. The two third end surfaces 304 are located at two opposite ends of the decorative part 30 in the direction X respectively, and the two fourth end surfaces 305 are located at two opposite ends of the decorative part 30 in the direction Y respectively.

The decorative part 30 is mounted on the support 20 and is fixedly connected to the support 20. The first decorative segment 31 is put right against the first support segment 211, and the second decorative segments 32 are put right against the second support segments 212. The two third end surfaces 304 are connected to the two first sub-tailbones 25 respectively, and the two fourth end surfaces 305 are connected to the two second sub-tailbones 26 respectively.

In this embodiment, the first sub-tailbones 25 provide protection for the second support segments 212 and the third end surfaces 304 of the decorative part 30, which can prevent the decorative part 30 from curling or damage from an end close to the third end surface 304. The second sub-tailbones 26 provide protection for the first decorative segment 31 and the fourth end surfaces 305, which can prevent the decorative part 30 from curling or damage from an end close to the fourth end surface 305 that affects aesthetics of the rear cover 1 and user experience.

The support 20 is mounted on the middle frame 10 and is fixedly connected to the middle frame 10. With the tailbone 22 provided on the support 20, a gap between the rear cover 1 and the middle frame 10 can be reduced, increasing aesthetics of the housing assembly 100.

Figure 27A:
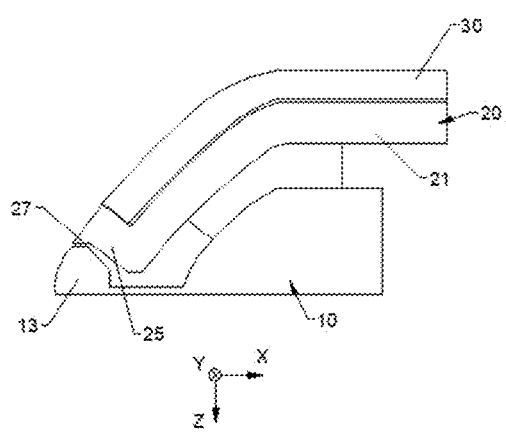
FIG. 27a is a partial structural schematic diagram of another implementation of the housing assembly according to Embodiment 3 of this application.
Figure 27B:
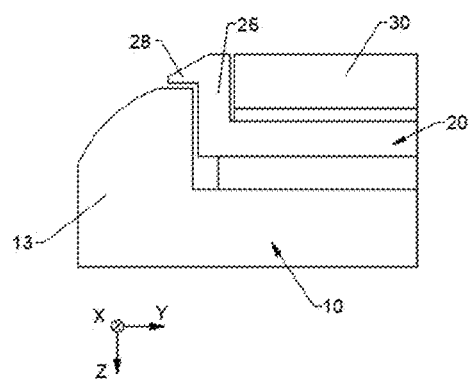
FIG. 27b is a partial structural schematic diagram of the housing assembly shown in FIG. 27a from another perspective.

Referring to FIG. 27a and FIG. 27b, FIG. 27a is a partial structural schematic diagram of another implementation of the housing assembly according to Embodiment 3 of this application, and FIG. 27b is a partial structural schematic diagram of the housing assembly shown in FIG. 27a from another perspective.

In this embodiment, the tailbone 22 further include two first sub-extensions 27 and two second sub-extensions 28. One such first sub-extension 27 is connected to a protrusion of one such first sub-tailbone 25 and extends from the corresponding protrusion towards a direction away from the support body 21. One such second sub-extension 28 is connected to a protrusion of one such second sub-tailbone 26 and extends from the second sub-tailbone 26 towards a direction away from the support body 21.

After the support 20 is assembled with the middle frame 10, the first sub-extensions 27 extend towards the corresponding border frame 13, with a maximum size of a gap between each first sub-extension 27 and the corresponding border frame 13 in the direction Z being 0.05 mm to 0.1 mm. In this embodiment, the maximum size of a gap between each first sub-extension 27 and the corresponding border frame 13 in the direction Z is 0.05 mm. The provided first sub-extensions 27 can further reduce a gap between the support 20 and the border frame 13, increasing aesthetics of the housing assembly 100.

The second sub-extensions 28 extend towards the border frame 13. The second sub-extensions 28 provide shielding for a gap between the support 20 and the border frame 13, which can avoid external dust or moisture into the gap to affect stability of connection between the rear cover and the middle frame 10. In addition, aesthetics of the housing assembly 100 can also be increased.

In other embodiments, any part of the second support segments may be curved relative to the first support segment. For example, one end of the second support segments in the direction X is curved relative to the first support segment, and the other end of the second support segments in the direction X and two opposite ends of the second support segments in the direction Y are all flat and straight.

The foregoing descriptions are merely some embodiments and implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A housing assembly, comprising a middle frame and a rear cover, wherein
the rear cover comprises a support and a decorative part, the support is made of fiber reinforced resin material, the fiber reinforced resin material is composite of continuous fiber and resin, the decorative part is made of vegan leather, silica gel, leather texture vegetation, or animal leather;
the support comprises a support body, a support end and a protrusion, the support end is connected to an outer edge of the support body, the support end is connected to the protrusion;
the support body comprises a first support surface and a second support surface, the first support surface and the second support surface facing away from each other;
protrusion protruding from the first support surface,
the decorative part is mounted on the first support surface with an end of the decorative part connected to the protrusion, and the support is mounted on the middle frame with the second support surface facing the middle frame.

2. The housing assembly of claim 1, wherein the support body comprises a first support segment and a second support segment, the second support segment is connected to an outer edge of the first support segment.

3. The housing assembly of claim 1, wherein the middle frame comprises a middle frame body, an avoidance part and a border frame, the border frame is connected to an outer edge of the middle frame body by the avoidance part, a groove is formed by the middle frame body, the avoidance part and the border frame; and
the support end or the protrusion is partially located in the groove, a gap is present between the support end and the avoidance part.

4. The housing assembly of claim 1, wherein the end of the decorative part comprises a decorative part end surface;
protrusion comprises a first protrusion surface, wherein the protrusion and the support body enclose a mounting recess with the first protrusion surface constituting a side surface of the mounting recess;
and the decorative part is mounted in the mounting recess with the decorative part end surface opposite the first protrusion surface.

5. The housing assembly of claim 4, wherein the protrusion comprises a protrusion end surface, wherein the protrusion end surface is connected to the first protrusion surface, with the protrusion end surface located at an end of the protrusion;
and the decorative part comprises a first decorative part surface and a second decorative part surface, wherein the first decorative part surface and the second decorative part surface face away from each other, and the decorative part is mounted on the support, with the second decorative part surface faces the support.

6. The housing assembly of claim 1, wherein the middle frame comprises a middle frame body and a border frame, the border frame is connected to an outer edge of the middle frame body, the middle frame body and the border frame enclose an accommodating recess;
and the rear cover is mounted in the accommodating recess.

7. The housing assembly of claim 5, wherein the protrusion comprises a second protrusion surface, wherein the second protrusion surface and the first protrusion surface face away from each other, the protrusion end surface is connected between the first protrusion surface and the second protrusion surface, and an included angle between the protrusion end surface and the first protrusion surface is an acute angle.

8. The housing assembly of claim 3, wherein the support further comprises an extension, wherein the extension is connected to the protrusion and extends towards the border frame.

9. The housing assembly of claim 6, wherein the support further comprises an extension, wherein the extension is connected to the protrusion and extends towards the border frame.

10. The housing assembly of claim 2, wherein an included angle between a length direction of the protrusion and an extension direction of the second support segment is 60 degrees to 120 degrees.

11. An electronic device, comprising
a body and a housing assembly, wherein
the body is mounted in the housing assembly;
the housing assembly comprises a middle frame and a rear cover;
the rear cover comprises:
a support and
a decorative part,
the support is made of fiber reinforced resin material, the fiber reinforced resin material is composite of continuous fiber and resin, the decorative part is made of vegan leather, silica gel, leather texture vegetation, or animal leather;
the support comprises a support body, a support end and a protrusion, the support end is connected to an outer edge of the support body, the support end is connected to the protrusion;
the support body comprises a first support surface and a second support surface, the first support surface and the second support surface facing away from each other;
the protrusion protruding from the first support surface,
the decorative part is mounted on the first support surface with an end of the decorative part connected to the protrusion, and the support is mounted on the middle frame with the second support surface facing the middle frame.

12. The electronic device of claim 11, wherein the support body comprises a first support segment and a second support segment, the second support segment is connected to an outer edge of the first support segment.

13. The electronic device of claim 11, wherein the middle frame comprises a middle frame body, an avoidance part and a border frame, the border frame is connected to an outer edge of the middle frame body by the avoidance part, a groove is formed by the middle frame body, the avoidance part and the border frame; and
the support end or the protrusion is partially located in the groove, a gap is present between the support end and the avoidance part.

14. The electronic device of claim 11, wherein the end of the decorative part comprises a decorative part end surface;
the protrusion comprises a first protrusion surface, wherein the protrusion and the support body enclose a mounting recess with the first protrusion surface constituting a side surface of the mounting recess;
and the decorative part is mounted in the mounting recess with the decorative part end surface opposite the first protrusion surface.

15. The electronic device of claim 14, wherein the protrusion comprises a protrusion end surface, wherein the protrusion end surface is connected to the first protrusion surface, with the protrusion end surface located at an end of the protrusion;
and the decorative part comprises a first decorative part surface and a second decorative part surface, wherein the first decorative part surface and the second decorative part surface face away from each other, and the decorative part is mounted on the support, with the second decorative part surface faces the support.

16. The electronic device of claim 11, wherein the middle frame comprises a middle frame body and a border frame, the border frame is connected to an outer edge of the middle frame body, the middle frame body and the border frame enclose an accommodating recess;
and the rear cover is mounted in the accommodating recess.

17. The electronic device of claim 15, wherein the protrusion comprises a second protrusion surface, wherein the second protrusion surface and the first protrusion surface face away from each other, the protrusion end surface is connected between the first protrusion surface and the second protrusion surface, and an included angle between the protrusion end surface and the first protrusion surface is an acute angle.

18. The electronic device of claim 13, wherein the support further comprises an extension, wherein the extension is connected to the protrusion and extends towards the border frame.

19. The electronic device of claim 16, wherein the support further comprises an extension, wherein the extension is connected to the protrusion and extends towards the border frame.

20. The electronic device of claim 12, wherein an included angle between a length direction of the protrusion and an extension direction of the second support segment is 60 degrees to 120 degrees.

* * * * *